US012736627B2

(12) United States Patent
Gebhardt et al.

(10) Patent No.: US 12,736,627 B2
(45) Date of Patent: Sep. 15, 2026

(54) SELF-SUPERVISED LEARNING

(71) Applicant: NVIDIA Corporation, Santa Clara, CA (US)

(72) Inventors: Patrik Gebhardt, Cupertino, CA (US); Alexander Popov, Kirkland, WA (US); Shane Murray, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 267 days.

(21) Appl. No.: 18/477,325

(22) Filed: Sep. 28, 2023

(65) Prior Publication Data

US 2025/0110213 A1 Apr. 3, 2025

(51) Int. Cl.
*G01S 7/41* (2006.01)
*G01S 13/58* (2006.01)
*G01S 13/931* (2020.01)

(52) U.S. Cl.
CPC .............. *G01S 7/417* (2013.01); *G01S 13/58* (2013.01); *G01S 13/931* (2013.01)

(58) Field of Classification Search
CPC ........ G01S 7/417; G01S 13/58; G01S 13/931; G01S 7/415; G01S 13/42; G01S 13/874; G01S 15/931; G01S 17/894; G01S 17/931; G01S 2013/9323; G01S 2013/9324; G06N 20/00; G06N 3/045
See application file for complete search history.

(56) References Cited

U.S. PATENT DOCUMENTS

| | | | | |
|---|---|---|---|---|
| 10,976,410 | B1 * | 4/2021 | Wang | G01S 13/726 |
| 12,158,991 | B2 * | 12/2024 | Matuszak | G06N 3/044 |
| 2022/0196798 | A1 * | 6/2022 | Chen | G01S 7/354 |
| 2023/0003872 | A1 * | 1/2023 | Qian | G01S 13/723 |
| 2023/0017983 | A1 * | 1/2023 | Kunz | G01S 13/931 |

OTHER PUBLICATIONS

Long, Yunfei, Daniel Morris, Xiaoming Liu, Marcos Castro, Punarjay Chakravarty, and Praveen Narayanan. "Full-velocity radar returns by radar-camera fusion." In Proceedings of the IEEE/CVF International Conference on Computer Vision, pp. 16198-16207. 2021. (Year: 2021).*

* cited by examiner

*Primary Examiner* — Yonghong Li
(74) *Attorney, Agent, or Firm* — Sanders IP Law

(57) ABSTRACT

In some embodiments, the method may include determining, using a machine learning model, an estimated velocity corresponding to an object based at least on measured RADAR data, where the measured RADAR data may correspond to RADAR detections associated with the object. In some embodiments, the method may further include determining expected RADAR data corresponding to the object based at least on the estimated velocity. Some embodiments may additionally include updating one or more parameters of the machine learning model based on the difference between the measured RADAR data and the expected RADAR data.

20 Claims, 12 Drawing Sheets

Server(s) 678

CPU 680(A)

CPU 680(B)

PCIE Switch 682(A)

PCIE Switch 682(B)

PCIE Switch 682(C)

PCIE Switch 682(D)

GPU 684(A)

GPU 684(B)

GPU 684(C)

GPU 684(D)

GPU 684(E)

GPU 684(F)

GPU 684(G)

GPU 684(H)

686

688

Network(s) 690

692

694

600

SELF-SUPERVISED LEARNING

BACKGROUND

Many systems are configured to perform object detection and/or tracking for a variety of applications. For example, some machine systems may be configured to detect and track objects in the environment at which a corresponding machine may be located. Such object detection and tracking may be used for a variety of applications—such as accident avoidance, autonomous driving operations, augmented object indicators, generation of warning signals, etc.

In some instances, the object detection may be based on radio detection and ranging (RADAR) data that may be obtained using one or more RADAR sensors. The RADAR data may include indications of RADAR detections that may correspond to one or more objects. Additionally or alternatively, one or more machine learning (ML) systems may be used to process the RADAR data to perform the object detection task.

In many instances, the ML based object detection systems ("detection systems") may be configured to track the RADAR detections over time. The tracking over time may also be used by the detection systems to identify objects by grouping detections that are relatively close together over time. In these or other embodiments, the object detection systems may generate bounding boxes for grouped detections in which the bounding boxes correspond to tracked objects. In some embodiments, detection systems may provide a size, orientation, and/or position of the bounding boxes to indicate respective information corresponding to the tracked objects.

However, in these traditional approaches, determinations regarding velocities of the tracked objects may lag behind the other determinations. Such a lag may be due to the object detection systems tracking the positions of objects over time (e.g., by tracking corresponding bounding boxes overtime) to determine corresponding velocities of the objects. Additionally, such a lag may occur due to the detection systems not initially correlating which detections and bounding boxes belong to the same object until some threshold amount of tracking information is accumulated.

SUMMARY

According to one or more embodiments of the present disclosure, one or more machine learning (ML) models—such as one or more neural networks—may be deployed to determine an estimated velocity corresponding to an object. In some embodiments, the ML model may estimate a velocity corresponding to the object based at least on measured RADAR data that may correspond to RADAR detections associated with the object. Further, one or more embodiments may include an ML model that may be configured to determine expected RADAR data that may correspond to the object. In some embodiments, the expected RADAR data may be based at least on the estimated velocity. In some embodiments, the ML model may be updated based at least on a difference between the measured RADAR data and the expected RADAR data.

The embodiments of the present disclosure may help improve object detection and tracking of objects by increasing the accuracy with which the ML detection system may make velocity determinations. Additionally or alternatively, one or more embodiments described in the present disclosure may decrease the amount of time the ML detection system may take to make velocity determinations as compared to one or more traditional techniques used for object detection and/or tracking.

BRIEF DESCRIPTION OF THE DRAWINGS

The present systems and methods for self-supervised velocity learning are described in detail in the present disclosure with reference to the attached drawing figures, wherein.

DETAILED DESCRIPTION

Figure 1:
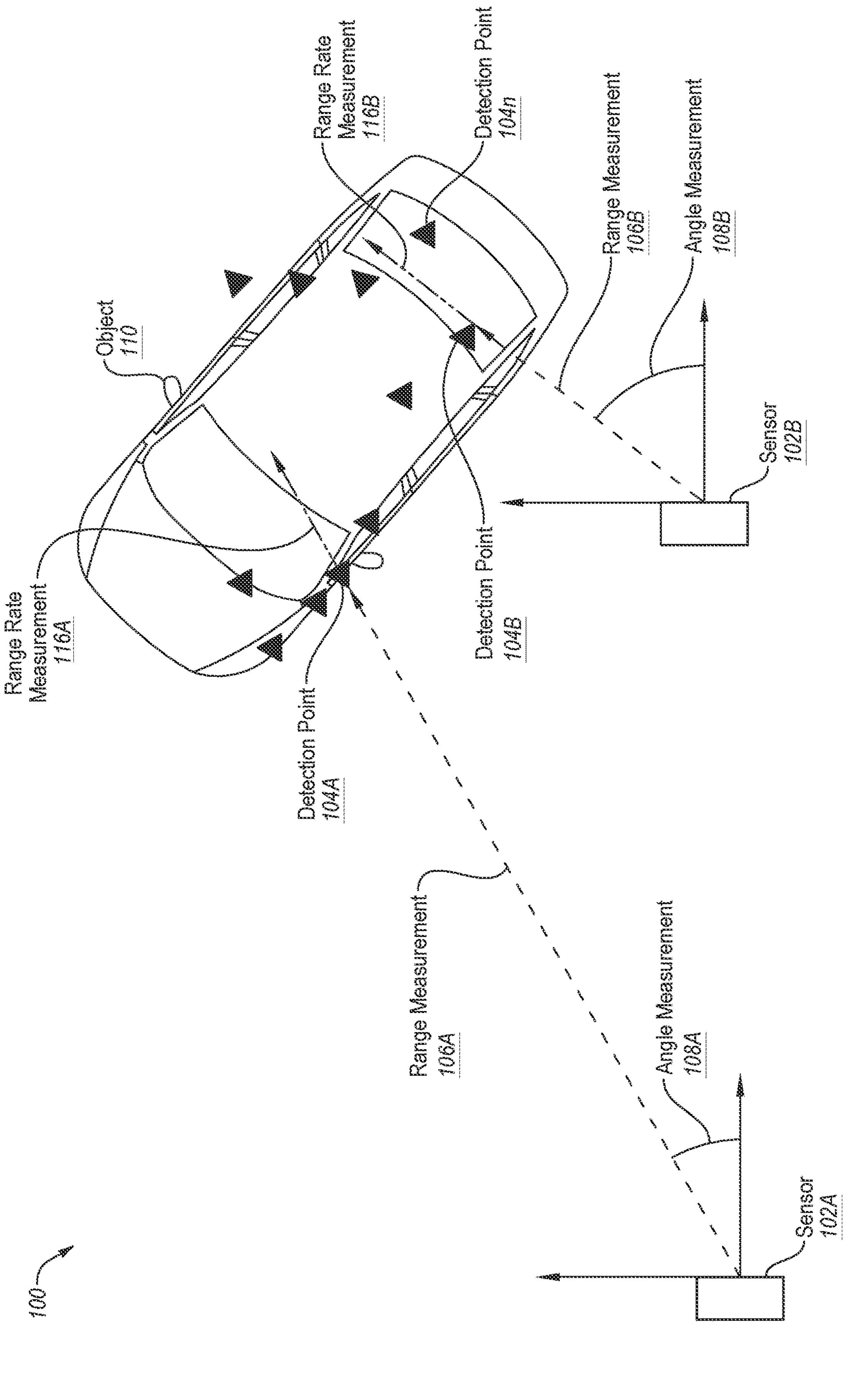
FIG. 1 is a diagram representing an example environment related to determining velocity of an object using multiple sensors, in accordance with one or more embodiments of the present disclosure.

One or more embodiments in the present disclosure may relate to object detection and/or object tracking. In some embodiments, a machine learning based object detection system ("ML detection system") may be trained and deployed to make velocity determinations for objects based on relationships between RADAR data included in detections taken by multiple RADAR sensors within a relatively short amount of time.

In some embodiments, the ML detection system may be configured to estimate one or more velocities corresponding to one or more portions of an object. In some embodiments, the one or more velocities may include one or more corresponding velocity vectors associated with the one or more portions of the object.

In some embodiments, the ML detection system may be trained using one or more frames of RADAR data to estimate one or more velocities. The one or more frames of RADAR data may include RADAR data that may be obtained using multiple RADAR sensors. Additionally or alternatively, the frames of RADAR data may be based on different RADAR scans taken by different RADAR sensors at different points in time and/or at different sampling rates.

In some embodiments, the one or more frames of RADAR data may include RADAR data that may include information corresponding to multiple RADAR detection points ("detection points"). The detection points may correspond to RADAR scans performed in a particular environment. The detection points may include points in the environment at which a RADAR signal is reflected back to a RADAR sensor performing a corresponding RADAR scan. In some instances, a RADAR signal may reflect off multiple portions of objects such that multiple detection points corresponding to an associated RADAR scan may correspond to a same object.

In some embodiments, the RADAR data corresponding to the detection points may include the RADAR data that may indicate a location and/or a position corresponding to the detection points. In some embodiments, the respective positions may be indicated using one or more range measurements and/or one or more angle measurements corresponding to the respective detection points. In some embodiments, the range measurements and the angle measurements may collectively be referred to as respective position measurements corresponding to the detection points.

In some embodiments, RADAR data corresponding to the detection points may include range rate measurements. The range rate measurements may indicate respective velocities at which the corresponding detection points may be moving away from or toward the corresponding RADAR sensors used to obtain the respective range rate measurements. In some embodiments, the range rate measurements may include respective velocity vectors that indicate a speed and direction. The velocity vectors may be referenced with respect to the RADAR sensor such that the directions may be along the same line as the same direction as the corresponding range measurements. Further, the range rate measurements may also be components of the actual velocities at the respective detection points as a function of the angle measurements. The range rate measurements may also be referred to as "radial velocity" measurements in the present disclosure.

In some embodiments, the ML, model may be configured, based on being trained using RADAR data corresponding to multiple sensors, to make determinations of expected RADAR data that corresponds to the velocity estimations. The expected RADAR data may be RADAR data that would result in the velocities of the estimated velocities. For example, in some embodiments, the expected RADAR data determination may include respective reverse calculations from the estimated velocity determinations as to what RADAR data would result in the velocities of the estimated velocities.

In some embodiments, the ML model may be configured to compare the expected RADAR data against the measured RADAR data. In some embodiments, the comparison may include determining a difference between the expected RADAR data and the measured RADAR data. The difference may indicate an error between the estimated velocities and the actual velocities.

The ML model may be configured to make one or more modifications based on the difference and may then make new velocity estimations based on the measured RADAR data. The new velocity estimations may be used to determine new expected RADAR data, which may then be compared against the measured RADAR data. The new comparison may then be used to modify the ML model. In some embodiments, such a process may be repeated until the difference (or error) is below a certain threshold.

Therefore, rather than employing one or more traditional techniques that may detect and/or track objects based on time-based position tracking of objects and corresponding bounding shapes, the ML detection system may be trained and/or deployed to make velocity determinations for objects based on relationships between detections taken by multiple RADAR sensors within a relatively short amount of time. Such a technique may improve the accuracy with which the ML detection system may make velocity determinations. Additionally or alternatively, using such a technique may decrease the amount of time the ML detection system takes to make velocity determinations as compared to one or more of the other, traditional techniques used for object detection.

One or more of the embodiments disclosed herein may relate to velocity determinations corresponding to one or more objects based on RADAR data, where the velocity determinations may be performed using one or more ego-machines, which may include any applicable machine or system that is capable of performing one or more autonomous or semi-autonomous operations. Example ego-machines may include, but are not limited to, vehicles (land, sea, space, and/or air), robots, robotic platforms, etc. By way of example, the ego-machine computing applications may include one or more applications that may be executed by an autonomous vehicle or semi-autonomous vehicle, such as an example autonomous or semi-autonomous vehicle or machine 600 (alternatively referred to herein as "vehicle 600" or 37 ego-machine 600) described with respect to FIGS. 6A-6D. In the present disclosure, reference to an "autonomous vehicle" or "semi-autonomous vehicle" may include any vehicle that may be configured to perform one or more autonomous or semi-autonomous navigation or driving operations. As such, such vehicles may also include vehicles in which an operator is required or in which an operator may perform such operations as well.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems that implement one or more language models, such as one or more large language models (LLMs) that process textual, audio, image, sensor, and/or other data types to generate one or more outputs, systems for hosting real-time streaming applications, systems for presenting one or more of virtual reality content, augmented reality content, or mixed reality content, systems for performing light transport simulation, systems for performing collaborative content creation for 3D assets, systems implemented at least partially using cloud computing resources, and/or other types of systems.

These and other embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

Now referring to FIG. 1, FIG. 1 is a diagram representing an example environment 100 related to determining velocity of an object 110 using multiple sensors 102, in accordance with one or more embodiments of the present disclosure.

In some embodiments, the example environment 100 may include a first sensor 102A and a second sensor 102B, referred to herein collectively as "the sensors 102." The first sensor 102A and the second sensor 102B are provided as examples only; in some embodiments, the environment 100 may include more than two sensors. Additionally or alternatively, the environment 100 may include a single sensor—e.g., the first sensor 102A or the second sensor 102B.

The sensors 102 may be configured to generate sensor data corresponding to the object 110. In some embodiments, the sensors 102 may be configured to generate sensor data that may indicate one or more measurements corresponding to one or more movement characteristics corresponding to the object 110 and/or one or more portions of the object 110 (e.g., position measurements, velocity measurements, acceleration measurements, etc. that respectively correspond to a particular portion of the one or more portions). In these and other embodiments, while the object 110 may be illustrated in FIG. 1 as a vehicle, the object 110 may be representative of one or more objects whose movement characteristics (e.g., position, velocity, acceleration, jerk, etc.) may be determined using sensor data that may have been generated using the sensors 102.

For example, the sensors 102 may include RADAR sensors that may be configured to transmit high-frequency radio waves toward the object 110, the high-frequency radio waves may be reflected off of the object 110 and/or portions of the object 110 such that the high-frequency radio waves may return to one or more receivers corresponding to the respective RADAR sensors. Based on the high-frequency radio waves returned to the one or more receivers corresponding to respective RADAR sensors, one or more properties, movement characteristics, and/or other information corresponding to the object 110 may be determined. For example, the one or more properties may include a position measurement, velocity measurement, acceleration measurement, etc. of the object 110 and/or portions of the object 110.

Although primarily described with respect to RADAR sensors and RADAR data, this is not intended to be limiting, and other sensor modalities and sensor data types may be implemented without departing from the scope of the present disclosure. For example, LiDAR, ultrasonic, image, depth, and/or other sensor modalities (and/or a combination or fusion thereof) may be implemented without departing from the scope of the present disclosure.

In some embodiments, the sensor data generated using the sensors 102 may correspond to one or more detection points 104. In some embodiments, the one or more detection points 104 may correspond to frames of sensor data that may be generated in a particular environment. The detection points 104 may include points in the particular environment at which a RADAR signal is reflected back to one of the sensors 102 performing a corresponding RADAR scan. In some instances, a RADAR signal may reflect off multiple portions of objects such that multiple detection points corresponding to an associated RADAR scan may correspond to a same object (e.g., the object 110). In some embodiments, the one or more detection points 104 may correspond to one or more portions of the object 110. For example, sensor data corresponding to the detection point 104A may indicate one or more movement characteristics corresponding to a first portion of the object 110. The sensor data corresponding to the detection point 104B may indicate one or more movement characteristics corresponding to a second portion of the object 110. Further, sensor data corresponding to detection point 104$n$ may indicate one or more movement characteristics corresponding to an nth portion of the object 110.

In some embodiments, sensor data corresponding to the one or more detection points 104 may be noisy relative to sensor data corresponding to one or more other detection points 104. For example, in the context of the first sensor 102A being a RADAR sensor, the first sensor 102A may transmit high-frequency waves toward the object 110. Continuing the example, the radio waves may bounce directly off of the object 110 back to one or more receivers corresponding to the first sensor 102A. Some radio waves may correspond to detections of reflections that may have bounced off the ground before and/or after striking some portion of the object 110 thereby generating some sensor data that may include more noise than the radio waves reflected back to the receivers directly from the object 110.

By way of example and not limitation, sensor data corresponding to a detection point 104 on a side of the object 110 facing away from the sensors 102 may include more noise than sensor data corresponding to one or more detection points 104 facing the sensors 102. Further, in some embodiments, one or more detection points 104 may correspond to objects, obstacles, and other areas around the object 110 rather than corresponding to the object 110 itself (e.g., rocks, barriers, signs, and other objects surrounding the object 110).

In some embodiments, the sensor data generated using the sensors 102 may indicate a location and/or a position of the object 110 and/or one or more portions of the object 110 relative to the sensor 102. In some embodiments, the position of the object 110 and/or one or more portions of the object 110 may be indicated using one or more range measurements 106 and/or one or more angle measurements 108 corresponding to the one or more detection points 104. For example, the range measurement 106A may correspond to a position of a first portion of the object 110 corresponding to detection point 104A relative to the first sensor 102A. Similarly, the range measurement 106B may correspond to a position of a first portion of the object 110 corresponding to detection point 104B relative to the first sensor 102B.

In some embodiments, the one or more range measurements 106 may indicate a distance between the one or more detection points 104 and the respective sensors 102 used to generate the sensor data. Additionally or alternatively, the angle measurement 108 may indicate an angle between the object 110 (or the detected portion of the object 110) and respective sensors 102. The range measurements 106 and the angle measurements 108 together may indicate a position of the object 110 and/or portions of the object 110 in relation to the respective sensors 102. In some embodiments, the range measurements 106 and the angle measurements 108 may collectively be referred to as a position measurement corresponding to the one or more detection points 104 and/or a position measurement of the object 110.

In some embodiments, the position of the object 110 and/or the position of one or more portions of the object 110 may be referenced based on the range measurement 106 and the angle measurement 108—e.g., such as in polar coordinates that are referenced from a position corresponding to one of the sensors 102. Additionally or alternatively, the range measurement 106 and the angle measurement 108 may be transformed into a different coordinate system, such as a cartesian coordinate system, by performing a transformation with respect to the range measurement 106 and the angle measurement 108.

For example, sensor data generated using a first sensor 102 may indicate a first position corresponding to the detection point 104A where the first position may be referenced using a first range measurement 106A and a first angle measurement 108A. Continuing the example, sensor data generated using the second sensor 102B may indicate a second position corresponding to the detection point 104B where the second position may be referenced using a second range measurement 106B and a second angle measurement 108B.

Additionally or alternatively, sensor data corresponding to one or more detection points 104 may include one or more range rate measurements 116. In some embodiments, the range rate measurements 116 may indicate respective velocities at which the corresponding detection points 104 may be moving away from or toward respective sensors 102 used to obtain the respective range rate measurements 116. In some embodiments, the range rate measurements 116 may include a velocity vector that may indicate a speed and direction. The velocity vector may be referenced with respect to respective sensors 102 such that the directions may be along the same line as the corresponding range measurements 106. Further, the range rate measurements 116 may also be components of the actual velocities at the respective detection points 104 as a function of the angle measurements 108. The range rate measurements 116 may also be referred to as "radial velocity" measurements in the present disclosure.

For example, sensor data generated using the first sensor 102A may include a first range rate measurement 116A that may indicate a first radial velocity of the detection point 104A. Continuing the example, the sensor data generated using the second sensor 102B may include a second range rate measurement 106B that may indicate a second radial velocity of the detection point 104B. In some embodiments, the first radial velocity and the second radial velocity may not be the same. In some embodiments, the range rate measurements 116 may describe and/or illustrate a radial velocity corresponding to one or more detection points 104 using a velocity vector in the same direction as the range measurement 106 vector.

In some embodiments, the first sensor 102A may generate sensor data that may correspond to one or more portions of the object 110. In some embodiments, the second sensor 102B may generate sensor data that may correspond to one or more other portions of the object 110. In some embodiments, the first sensor 102A and the second sensor 102B may generate sensor data that may correspond to one or more of the same portions of the object 110.

In some embodiments, the first sensor 102A and the second sensor 102B may generate sensor data at the same or substantially the same time stamp. Additionally or alternatively, the first sensor 102A and the second sensor 102B may generate sensor data that may correspond to different time stamps. In some embodiments, the first sensor 102A and the second sensor 102B may generate sensor data within a particular time frame relative to each other. For example, the first sensor may generate first data corresponding to the object 110 at time $t_1$. Continuing the example, the second sensor 102B may generate second data corresponding the object 110 at time $t_2$, where $t_2$ is some time after $t_1$—e.g., five (5) milliseconds, ten (10) milliseconds, fifty (50) milliseconds, etc.

In some embodiments, the first sensor 102A may be in a different location relative to the second sensor 102B. In some embodiments, sensor data corresponding to respective sensors 102 may include one or more measurements made relative to respective sensors. For example, the first sensor 102A may include a first RADAR sensor that may perform a first RADAR scan from a first position. Based on the first RADAR scan, the first sensor 102A may determine a first position measurement corresponding to the object 110 relative to the first sensor 102A. Continuing the example, the second sensor 102B may perform a second RADAR scan from a second position that may be different from the first position. Further, a second position measurement may be measured based on the second RADAR scan, where the second position measurement may correspond to the object 110 relative to the second position corresponding to the second sensor 102B.

In some embodiments, one or more frames of sensor data may be generated using the one or more of the sensors 102, where the one or more frames of sensor data may refer to sensor data that may be obtained using the first sensor 102A, the second sensor 102B, or both of the sensors 102. In some embodiments, the one or more frames of sensor data may be based on different scans that may be taken by one or more of the sensors 102 at different points in time and/or using different sampling rates. For example, the different scans may refer to different RADAR scans that may be taken by one or more RADAR sensors at different points in time and/or using different RADAR sampling rates.

In some embodiments, one or more respective frames of sensor data may correspond to an associated frame period. In some embodiments, the frame period may describe sensor data that may have been generated using the sensors 102 during a particular time period. For example, the frame period may correspond to a particular half second of time such that the corresponding frame of sensor data may include sensor data collected by the sensors 102 during that particular half second of time.

In some embodiments, one or more frames of sensor data may include sensor data corresponding to a single scan performed by each of the sensors 102 during corresponding frame periods. Additionally or alternatively, one or more frames of sensor data may include sensor data corresponding to more than one scan performed by each of the sensors 102 during their corresponding frame periods. In these or other embodiments, one or more frames of sensor data may include all the sensor data that may be collected during their corresponding frame periods.

In some embodiments, the sampling rates used by the sensors 102 may be varied during the corresponding frame periods. In some embodiments, one or more individual sensors (e.g., the first sensor 102A and/or the second sensor 102B) may vary their own sampling rates. Additionally or alternatively, the sampling rates used by the sensors 102 may vary. The varying of the sampling rates may help disambiguate one or more measurements corresponding to the object 110 and compensate for aliasing effects with respect to one or more measurements due to the actual measurements corresponding to the object 110 (e.g., at the detection points 104) being greater than the Nyquist frequency of the one or more measurements.

The varying sampling rates, the different locations of the sensors 102, and the multiple detection points 104 may accordingly be such that the frames of sensor data may include many different combinations of sensor data measurements (e.g., different combinations of range measurements 106, angle measurements 108, range rate measurements 116, etc.).

In some embodiments, the sensor data may include associated metadata. The metadata may indicate which of the sensors 102 was used to obtain which sensor data associated with which portion of the object 110. In some embodiments, the metadata associated with the sensor data may include one or more characteristics corresponding to a particular sensor 102. For example, the metadata may include a location corresponding to a particular sensor 102, one or more sampling rates associated with a particular sensor 102, the sensor 102 from which the sensor data may have been generated, doppler ranges corresponding to a particular sensor 102, a range of values and a range of certainty corresponding to sensor data associated with respective sensors 102, and/or other characteristics, properties, and/or other information associated with a particular sensor 102.

In some embodiments, the metadata may include information corresponding to the sensor data and/or the object 110 being detected using the sensor data. For example, the metadata may include one or more doppler values corresponding to a direction the object 110 may be moving relative to a particular sensor 102. Further, the metadata may include a radar cross-section ("RCS") corresponding to the object 110 detected using the sensor data which may indicate a degree to which the object 110 is visible to the one or more sensors 102. Additionally or alternatively, the metadata may include an amplitude of reflection indicating an amount of strength a particular signal may return to the one or more sensors 102—e.g., the strength of a returning RADAR signal to a RADAR sensor.

Modifications, additions, or omissions may be made to FIG. 1 without departing from the scope of the present disclosure. For example, the number of sensors 102, the object 110, the locations of the sensors 102, and sampling rates corresponding to the sensors 102 may vary. Further, the number and/or locations of detection points 104 may vary. The specifics given and discussed are to help provide explanation and understanding of concepts of the present disclosure and are not meant to be limiting.

Figure 2A:
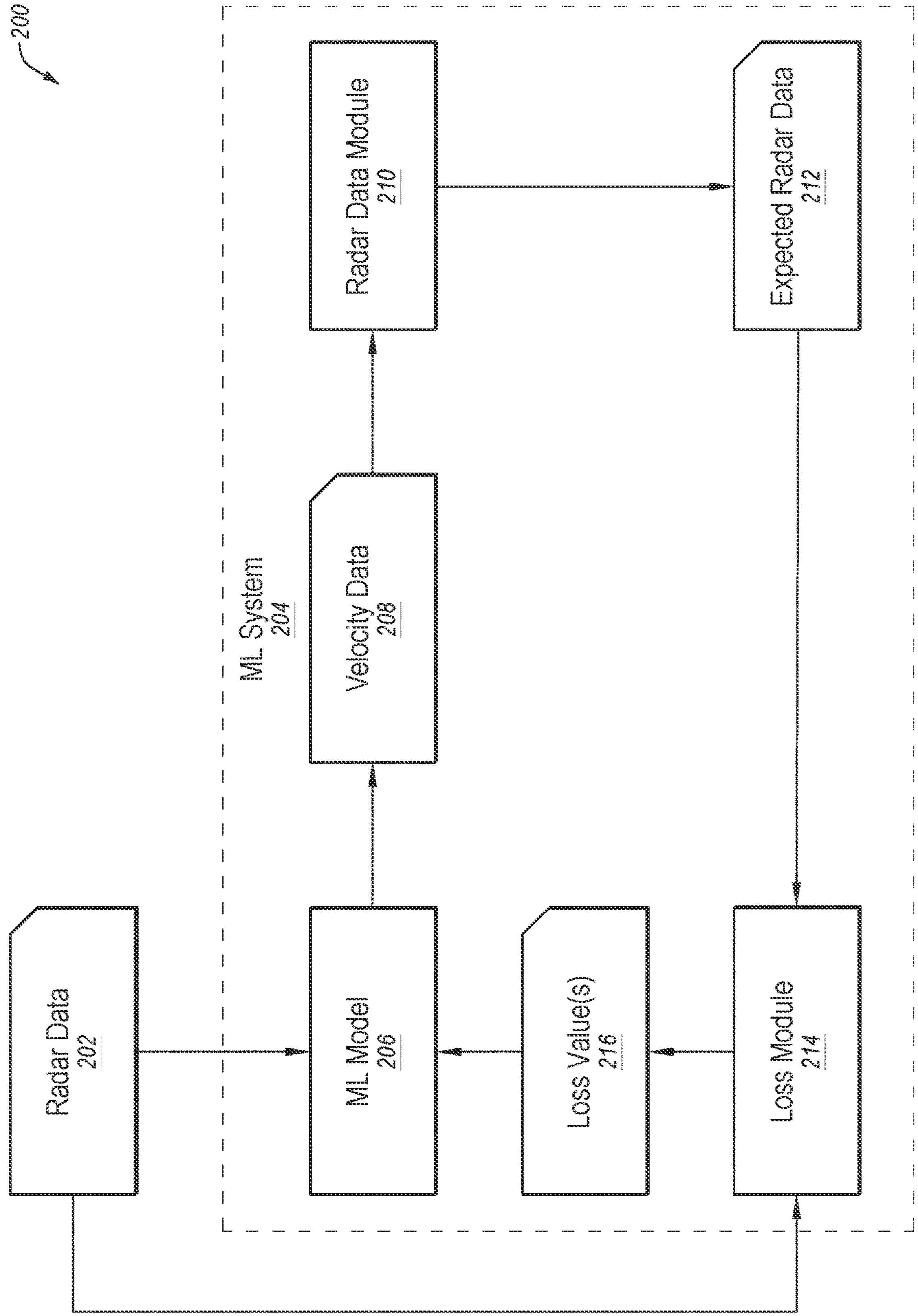
FIG. 2A is a diagram representing an example environment related to generating output data based on RADAR data, in accordance with one or more embodiments of the present disclosure.

FIG. 2A is a diagram representing an example environment 200 related to generating output data based on RADAR data 202, in accordance with one or more embodiments of the present disclosure. In some embodiments, the environment 200 may include an ML system 204 that may be trained using the RADAR data 202 to determine one or more estimated velocities corresponding to one or more objects within an environment.

In some embodiments, the RADAR data 202 may be an example of the sensor data generated using the one or more sensors 102 described and/or illustrated further in the present disclosure, such as, for example, with respect to FIG. 1. For example, the RADAR data 202 may include one or more movement characteristics corresponding to one or more portions of an object in an environment. For example, the sensor data corresponding to one or more detection points 104 indicating one or more respective range measurements 106, angle measurements 108, range rate measurements 116, etc. that may be associated with the one or more detection points 104. Further, the RADAR data 202 may include metadata associated with the sensor data generated, for example, using one or more RADAR sensors (e.g., the sensors 102).

In some embodiments, the RADAR data 202 may include raw, non-annotated RADAR data 202. Additionally or alternatively, the RADAR data 202 may include annotations directed toward training an ML model (e.g., the ML model 206). In some embodiments, the RADAR data 202 may be communicated, transmitted, and/or otherwise obtained by the Machine Learning (ML) system 204 and/or the ML model 206.

The ML system 204 may include one or more systems, subsystems, embedded systems, modules, and/or other hardware and software components corresponding to one or more processes that may be configured to create, train, deploy, and/or maintain one or more machine learning models (e.g., the ML model 206). In some embodiments, the ML system 204 may refer to an end-to-end infrastructure or pipeline that may be configured to train the ML model 206.

In some embodiments, the ML system 204 may include one or more of the modules, models, algorithms, etc. that may be configured to perform operations associated with training the ML model 206. Additionally or alternatively, the ML system 204 may include one or more other models, subsystems, modules, etc. that may perform one or more operations using the RADAR data 202. In some embodiments, the ML system 204 may include an ML model 206, a RADAR data module 210, and a loss module 214 that may be configured to train the ML model 206 using the RADAR data 202.

The particular configuration of models and modules corresponding to FIG. 2 is not meant to be limiting, but illustrative of a framework associated with the ML system 204 that may be configured to train one or more ML models (e.g., ML model 206). In particular, the modules may be configured to train the ML model 206 to determine and/or generate an estimated velocity associated with one or more portions of an object corresponding to the RADAR data 202.

In some embodiments, the ML model 206, the RADAR data module 210, and/or the loss module 214 may include code and routines configured to allow a computing system to perform one or more operations. Additionally or alternatively, the ML model 206, the RADAR data module 210, and/or the comparing module 214 may be implemented using hardware including one or more processors, CPUs graphics processing units (GPUs), data processing units (DPUs), parallel processing units (PPUs), microprocessors (e.g., to perform or control performance of one or more operations), field-programmable gate arrays (FPGA), application-specific integrated circuits (ASICs), accelerators (e.g., deep learning accelerators (DLAs)), and/or other processor types. In these and other embodiments, the ML model 206, the RADAR data module 210, and/or the loss module 214 may be implemented using a combination of hardware and software. In the present disclosure, operations described as being performed by respective modules and/or models may include operations that the ML model 206, the RADAR data module 210, and/or the loss module 214 may direct a corresponding computing system to perform. In these or other embodiments, the ML model 206, the RADAR data module 210, and/or the loss module 214 may be implemented by one or more computing devices, such as that described in further detail with respect to FIGS. 6A-6D, 7, and/or 8.

The ML model 206 may include one or more ML models, deep learning models, neural networks, deep neural networks ("DNNs") convolutional neural networks ("CNNs"), and other ML models and systems that may be configured to perform one or more operations using the RADAR data 202. In some embodiments, the ML model 206 may include one or more models of different types; for example, the ML model 206 may include one or more supervised learning models, self-supervised learning models, semi-supervised models, reinforcement learning models, and other ML models that may be trained using RADAR data 202.

In some embodiments, the ML model 206 may include one or more layers that may be configured to perform one or more operations using the RADAR data 202. For example, the ML model 206 may include one or more layers that may be configured to receive the RADAR data 202. Further, the one or more layers may enable one or more portions of the ML model 206 to extract one or more features, elements, patterns, and/or portions of RADAR data 202. For example, the one or more input layers may include one or more sets of filters and/or kernals that may be used to perform one or more mathematical operations using the RADAR data 202. Continuing the example, the mathematical operations, kernals, and/or sets of filters may be used to highlight one or more patterns, features, and/or portions of the input data 202.

In some embodiments, the ML model 206 may include one or more additional layers that may enable the ML model 206 to determine and/or generate one or more outputs including, for example, the velocity data 208. For example, the ML model 206 may be configured to receive RADAR data 202 including range measurements 106, angle measurements 108, range rate measurements 116, and corresponding metadata that may correspond to various detection points 104 and various sensors 102. Continuing the example, using the RADAR data 102, the ML model 206 may generate one or more estimated velocities corresponding to the RADAR data 102. The one or more estimated velocities may be included in the velocity data 208.

The velocity data 208 may include estimated velocities corresponding to an environment (e.g., the environment 100) which may include one or more objects (e.g., the object 110). In some embodiments, the velocity data 208, rather than being associated with a discrete or particular object, the velocity data 208 may be estimated corresponding to an entire area or environment to which the RADAR data 202 may correspond. For example, rather than determining a position and orientation of an object (e.g., the object 110) and subsequently determining a velocity corresponding to the object, the ML model 206 may be configured to generate velocities corresponding to individual portions of an environment based on the RADAR data 202 regardless of whether the velocity corresponds to a particular object.

Figure 2B:
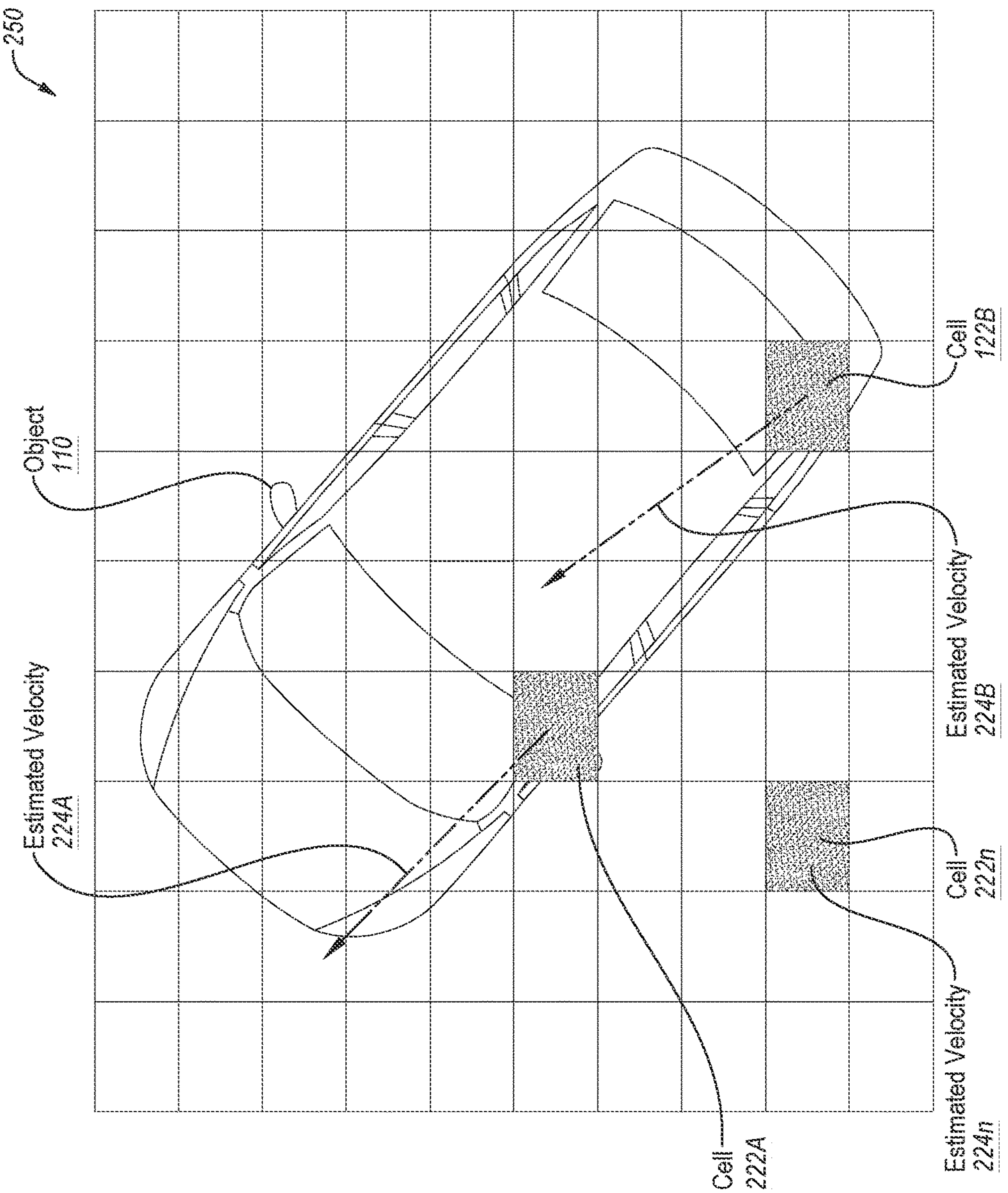
FIG. 2B is a diagram representing a data field including estimated velocity vectors corresponding to respective cells in the data field, in accordance with one or more embodiments of the present disclosure.

An example representation of the velocity data 208 may be described with respect to FIG. 2B, FIG. 2B is a diagram representing a data field 250 including estimated velocity vectors 224 corresponding to respective cells 222 in the data field 250, in accordance with one or more embodiments of the present disclosure.

In some embodiments, the data field 250 may be a representation of an environment corresponding to the RADAR data 202. The representation of the environment may be generated using the RADAR data 202. For example, the data field 250 may represent the environment 100 associated with the object 110 described and/or illustrated further in the present disclosure, such as, for example, with respect to FIG. 1. In some embodiments, the data field 250 may be a two-dimensional, top-down representation of the environment—e.g., the environment 100. While the object 110 may be illustrated within the data field 250, the data field 250 may not include a visual representation of the object 110; rather, the data field 250 may include data that may represent RADAR data 202 that may correspond to the object 110.

In some embodiments, the data field 250 may be organized and/or subdivided using a grid or a grid-like data structure that may be configured to separate and/or discretize data to correspond to particular locations within the environment. In some embodiments, the grid may include one or more cells 222 that may include data that may correspond to respective locations corresponding to the environment. In these or other embodiments, the grid may include any number of cells 222 including data corresponding to particular locations within the environment. For example, the environment may include an area that may be described using data included in a 10×10 cell grid, that is, 100 individual cells 222. Continuing the example, the same environment may include the area that may be described using data included in a 100×100 cell grid, that is 10,000 individual cells 222. The individual cells 222 in the 100×100 cell grid may individually represent a smaller area corresponding to the environment that the individual cells in the 10×10 cell grid.

In some embodiments, the grid corresponding to the data field 250 may include a first cell 222A, a second cell 222B, up to and including an nth cell 222*n*. In some embodiments, the first cell 222A may correspond to a first portion of the environment. In some embodiments, the first cell 222A may correspond to a first portion of the object 110 that may be within the first portion of the environment. Additionally or alternatively, the second cell 222B may correspond to a second portion of the environment. The second cell 222B may additionally correspond to a second portion of the object 110 that may be within the second portion of the environment. The nth cell 222*n* may correspond to an nth portion of the environment and may not correspond to a portion of the object 110 and/or correspond to a portion of another object within the nth portion of the environment.

In some embodiments, individual cells 222 may respectively correspond to estimated velocity vectors 224. For example, a first estimated velocity vector 224A may correspond to the first cell 222A, a second estimated velocity vector 224B may correspond to the second cell 222B, and an nth estimated velocity vector 224*n* may correspond to the nth cell 222*n*.

In some embodiments, the estimated velocity vectors 224 indicate a direction and magnitude corresponding to a velocity of an object or a portion of the object within the particular location associated with respective cells 222. In some embodiments, the estimated velocity vectors 224 may be determined based on the RADAR data 202 corresponding to the particular location. For example, the first cell 222A may correspond to a location in the environment where RADAR data 202 may have been generated. The RADAR data 202 may include one or more detection points corresponding to one or more locations to which the first cell 222A may correspond.

In some embodiments, a particular estimated velocity 224 may represent a weighted aggregation or determination based on RADAR data 202 corresponding to, for example, multiple detection points (e.g., detection points 104) associated with a particular location in the environment. For example, the RADAR data 202 associated with a particular location may include multiple range measurements, multiple angle measurements, multiple range rates, etc. from which an estimated velocity 224 may be determined.

In some embodiments, an estimated velocity 224 corresponding to a particular cell 222 may be zero (0) or not include a direction and magnitude. The estimated velocity of zero may indicate that there may not be RADAR data 202 associated with a particular location in the environment. Additionally or alternatively, an estimated velocity of zero or an absence of an estimated velocity may correspond to an object or a portion of an object that may be stationary. For example, the nth estimated velocity 224*n*—or lack thereof—corresponding to the nth cell 222*n* may represent a stationary object corresponding to a location in the environment associated with the nth cell.

In some embodiments, while FIG. 2B illustrates estimated velocity vectors 224 corresponding to three individual (3) cells 222, individual estimated velocity vectors 224 may be determined and/or assigned to each of the individual cells 222 corresponding to the grid used to organize the data field 250. And, correspondingly, the velocity vectors corresponding to respective cells 222 may represent velocities corresponding to one or more objects (e.g., the object 110) and/or portions of the one or more objects located in respective locations in the environment corresponding to individual cells 222.

Modifications, additions, or omissions may be made to FIG. 2B without departing from the scope of the present disclosure. For example, the size of the data field 250, the size of the area corresponding to the environment, the number of objects 110 in the environment, the number of cells 222 within the environment, the directions, and magnitudes of estimated velocities 224 may vary. The specifics given and discussed are to help provide explanation and understanding of concepts of the present disclosure and are not meant to be limiting.

Returning to the description of FIG. 2A, the velocity data 208 may be communicated or transmitted to the RADAR data module 210. The RADAR data module 210 may be configured to perform one or more operations corresponding to the velocity data 208 to generate expected RADAR data 212.

In some embodiments, the RADAR data module 210 may be configured to perform one or more calculations to determine expected RADAR data 212 corresponding to the velocity data 208 generated using the ML model 206. In some embodiments, the calculations may include determining expected detection point measurements for respective detection points based on the estimated velocities (e.g., the estimated velocities 224); the respective positions of the individual detection points (e.g., as indicated in the respective measured RADAR data 202 corresponding to the detection points); the relative positions of the individual detection points with respect to each other; which RADAR sensors were used to obtain the respective RADAR data of the individual detection points (e.g., as indicated in the corresponding metadata); the respective RADAR sampling rates used by the respective RADAR sensors; known relationships between such information and RADAR data measurements; and other metadata associated with the RADAR data 202 such as, for example, the RCS corresponding to one or more objects, the one or more doppler values, one or more amplitudes of reflection, etc.

In some embodiments, the expected RADAR data 212 may include data corresponding to one or more movement characteristics corresponding to one or more portions of one or more objects located within an environment. The movement characteristics including, for example, one or more range measurements, angle measurements, range rate measurements, etc. In some embodiments, the expected RADAR data 212 may include data and/or information corresponding to one or more detection points, the one or more detection points may be analogous to the detection points 104 described and/or illustrated further in the present disclosure, such as, for example, with respect to FIG. 1.

The expected RADAR data 212 may correspond to one or more detection points and may include corresponding range measurements, angle measurements, range rate measurements, etc. for individual detection points. In some embodiments, the expected RADAR data 212 may include data that may be in the same format as the RADAR data 202 such that the expected RADAR data 212 and the RADAR data 202 may be compared. In these or other embodiments, the expected RADAR data 212 may be communicated or otherwise received by the loss module 214.

The loss module 214 may be configured to apply one or more loss functions that may be configured to generate, compute, and/or determine one or more loss values 216. The one or more loss values 216 may be determined by comparing the expected RADAR data 212 with the RADAR data 202 using the one or more loss functions. In some embodiments, the one or more loss functions may include, for example, a mean squared error function, mean absolute error function, a Huber loss function, log-cosh function, quantile loss function, and/or other loss functions that may be configured to compare the expected RADAR data 212 and the RADAR data 202.

In some embodiments, the one or more loss values 216 may include one or more values indicating an error between two individual portions of the RADAR data 202 and the expected RADAR data 212. For example, the loss value 216 may represent an error corresponding to comparing individual detection points. Additionally or alternatively, the loss values 216 may include an aggregated error that may represent an overall performance of the ML model 206 in generating an overall comparison between the expected RADAR data 212 in the aggregate and the RADAR data 202 in the aggregate.

In some embodiments, the one or more loss values 216 may be used by the ML model 206 as an indication to change and/or adjust one or more parameters, weights, biases, etc. within the ML model 206 to decrease the one or more loss values 216. The reduction in the one or more loss values 216 may indicate an improvement in the ML model 206 performance. That is, the reduction in the one or more loss values 216 may indicate that the ML model 206 may improve one or more velocity estimations corresponding to the velocity data 208. In some embodiments, the ML model 206 may change one or more parameters, weights, biases, etc. iteratively until the ML model 206 may have decreased the one or more loss values 216 to below a particular threshold. For example, the ML model 206 may be changed using one or more nonlinear optimization algorithms such as, stochastic gradient descent algorithms, adaptive moment estimation ("ADAM") algorithms, and/or other algorithms that may be configured to change one or more parameters corresponding to the ML model 206.

In some embodiments, the particular threshold may be determined based on one or more heuristic analyses where the particular threshold may be an indicator that the ML model 206 may accurately estimate one or more velocities based on RADAR data 202. For example, it may be determined that one or more loss values 216 indicating that the expected RADAR data 212 is within a particular percentage of the RADAR data 202 (e.g., 1%, 2%, 5%, 10%, etc.) may correspond to velocity data 208 that may be accurately represent actual velocities corresponding to objects and/or portions of objects within a particular environment.

Figure 3:
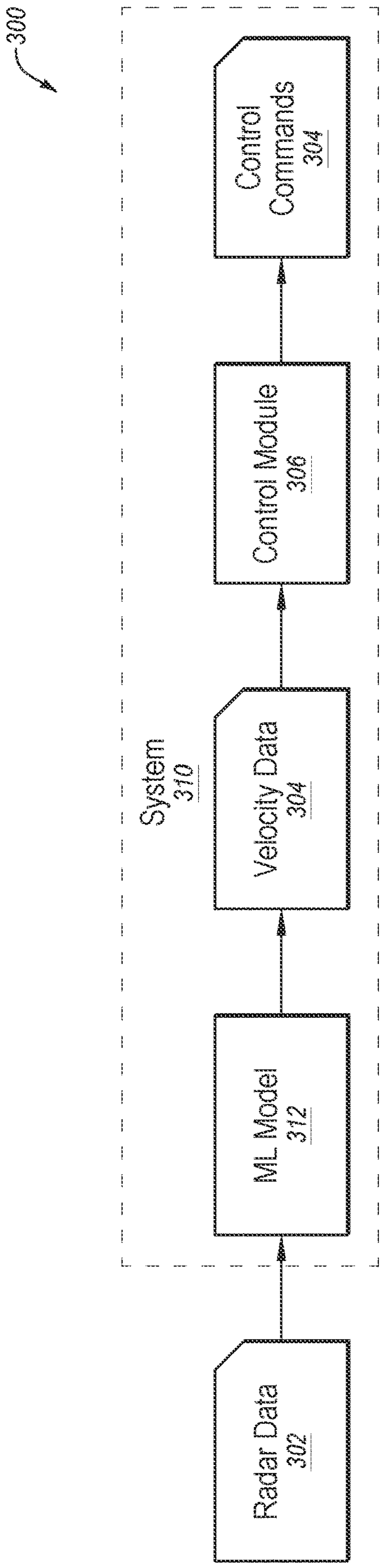
FIG. 3 is a diagram representing an example environment related to deployment of the ML model, in accordance with one or more embodiments of the present disclosure.

In some embodiments, in response to the one or more loss values 216 reaching a particular threshold, it may be determined that the ML model 206 may be ready for deployment, for example, as described and illustrated, with respect to FIG. 3. In some embodiments, in response to the one or more loss values 216 not reaching the particular threshold, the ML model 206 may change one or more parameters to regenerate velocity data 208 and re-determine one or more loss values 216 iteratively until the particular threshold may be reached.

Modifications, additions, or omissions may be made to FIG. 2A without departing from the scope of the present disclosure. For example, the size of the amount of RADAR data 202, the ML model 206, the amount of velocity data 208, the expected RADAR data, the loss model 214, and/or the one or more loss values 216 may vary. The specifics given and discussed are to help provide explanation and understanding of concepts of the present disclosure and are not meant to be limiting.

FIG. 3 is a diagram representing an example environment 300 related to deployment of a ML model 312, in accordance with one or more embodiments of the present disclosure. In some embodiments, the environment 300 may include a system 310 whose operations may be modified based on RADAR data 302.

The RADAR data 302 may be the same as or analogous to the RADAR data 202 described and/or illustrated further in the present disclosure, such as, for example, with respect to FIG. 2A. Additionally or alternatively, the RADAR data 302 may be different from the RADAR data 202. For example, the RADAR data 202 may be used by the ML system 204 to train, fine-tune, and/or otherwise change the ML model 206 such that the ML model 206 may generate more accurate estimated velocities (e.g., the velocity data 208, the estimate velocities 224, etc.). By comparison, the RADAR data 302 may correspond to a particular environment for which the ML model 312 that may have already been trained may be configured to generate one or more estimated velocities.

In some embodiments, while the RADAR data 302 may include data from one or more different RADAR scans from one or more different RADAR sensors in one or more different environments from the RADAR data 202, the characteristics of the RADAR data 302 may be the same as, and/or analogous to, the RADAR data 202. For example, the RADAR data 302 may include data corresponding to one or more detection points and may include one or more movement characteristics, such as, for example, range measurements, angle measurements, range rates, etc. Further, the RADAR data 302 may include metadata consistent with the RADAR data 202, such as, for example, doppler values, sampling rates, amplitudes of reflection, RCS measurements, and other metadata that may be consistent with the RADAR data 202. In some embodiments, the RADAR data 302 may be transmitted, communicated, and/or otherwise received to the system 310 and/or the ML model 312.

The system 310 may include one or more systems, subsystems, embedded systems, etc. that may be configured to use or operate in conjunction with the ML model 312 to change one or more operations based on received or otherwise obtained RADAR data 302. The system 310, for example, may include one or more machines, ego-machines, vehicles (e.g., autonomous and/or semi-autonomous vehicles), computing systems, drones, and other systems that may be configured to receive RADAR data 302 and/or change one or more operations based on velocity data 304 generated using the ML model 312.

In some embodiments, the system 310 may include one or more ML models and/or modules that may be configured to perform one or more operations based on the RADAR data 302. In some embodiments, the system 310 may not include the one or more ML models and/or modules; rather the system 310 may include one or more systems that may be configured to receive direction from one or more other ML models and/or modules that may correspond to one or more other systems. In some embodiments, the system 310 may include the ML model 312 and the control module 306.

In some embodiments, the ML model 312 and/or the control module 306 may include code and routines configured to allow a computing system to perform one or more operations. Additionally or alternatively, the ML model 312 and/or the control module 306 may be implemented using hardware including one or more processors, CPUs, GPUs, DPUs, PPUs, microprocessors (e.g., to perform or control performance of one or more operations), FPGA, ASICs, accelerators (e.g., DLAs), and/or other processor types. In these and other embodiments, the ML model 312 and/or the control module 306 may be implemented using a combination of hardware and software. In the present disclosure, operations described as being performed by the ML model 312 and/or the control module 306 may include operations that the ML model 312 and/or the control module 306 may direct a corresponding computing system to perform. In these or other embodiments, the ML model 32 and/or the control module 306 may be implemented by one or more computing devices, such as that described in further detail with respect to FIGS. 6A-6D, 7, and/or 8. In some embodiments, the ML model 312 may be configured to receive or otherwise obtain the RADAR data 302.

The ML model 312 may be the same as or similar to the ML model 206 described further in the present disclosure, such as, for example, with respect to FIG. 2A. In some embodiments, the ML model 312 described with respect to FIG. 3 may include an ML model 312 that may have been trained using the ML system 204 based on the RADAR data 202. In some embodiments, the ML model 312 may be configured to perform one or more operations using the RADAR data 302 to generate velocity data 304.

The velocity data 304 may be analogous to the velocity data 208 described and/or illustrated further in the present disclosure, such as, for example, with respect to FIG. 2A. Further, the velocity data 308 may be structured and/or organized in the same way or in a similar way to the velocity data 208 described and illustrated, for example, with respect to FIG. 2B. For example, the velocity data 304 may be organized into one or more data fields organized using one or more grids, the one or more grids including cells that may represent particular locations of an environment. Continuing the example, the one or more cells may correspond to a velocity vector, where individual velocity vectors represent respective velocities associated with an object or portions of an object within the particular location represented by particular cells.

In some embodiments, the velocity data 304 may be generated based on the RADAR data 302. For example, RADAR data 302 may include one or more detection points corresponding to objects within an environment. Continuing the example, the ML model 312 may be configured to use the RADAR data 302 to generate estimated velocities within the environment based on the one or more detection points. In some embodiments, the velocity data 304 may be communicated, transmitted, or otherwise received by the control module 306.

In some embodiments, the control module 306 may be configured to generate one or more control commands 308 based on the velocity data 304. In some embodiments, in the context of the system 310 including one or more ego-machines, the control module 306 may include modules and/or subsystems configured to control perception, control, communication, planning, mapping, localization, etc.

The control commands 308 may include one or more instructions (e.g., that may be output as control signals) that may indicate and/or cause a change in one or more of the characteristics associated with a state of the system 310 and/or one or more other systems. For example, in the context of the system 310 as a vehicle, the one or more control commands 308 may include increasing or decreasing the vehicle speed (e.g., via one or more control signals that control the brake and/or the gas pedal), turning the vehicle in a given direction (e.g., via one or more control signals that control the steering), adjusting a center line for the vehicle to follow (e.g., via one or more control signals that control the steering), or any other change or any combination of the aforementioned changes. In some embodiments, the one or more control commands 308 may include one or more instructions that may indicate no change in the system 310. For example, the control command(s) 308 may instruct that the system 310 to maintain a current state of the system 310 (e.g., speed, acceleration, direction, etc.).

As an additional example, in the context of the system 310 as a vehicle, the control module 308 corresponding to the vehicle may receive velocity data 304 that may indicate one or more changes in velocities corresponding to objects around the vehicle (e.g., other vehicles, cyclists, pedestrians, etc.). The control module 306, in response to the indication of one or more velocity changes, may generate one or more control commands 308 that may adjust a plan for the trajectory or route of the vehicle.

Modifications, additions, or omissions may be made to FIG. 3 without departing from the scope of the present disclosure. For example, the size of the amount of RADAR data 302, the ML model 312, the amount of velocity data 304, the control module 306, and/or the number of systems 310 may vary. The specifics given and discussed are to help provide explanation and understanding of concepts of the present disclosure and are not meant to be limiting.

Figure 4:
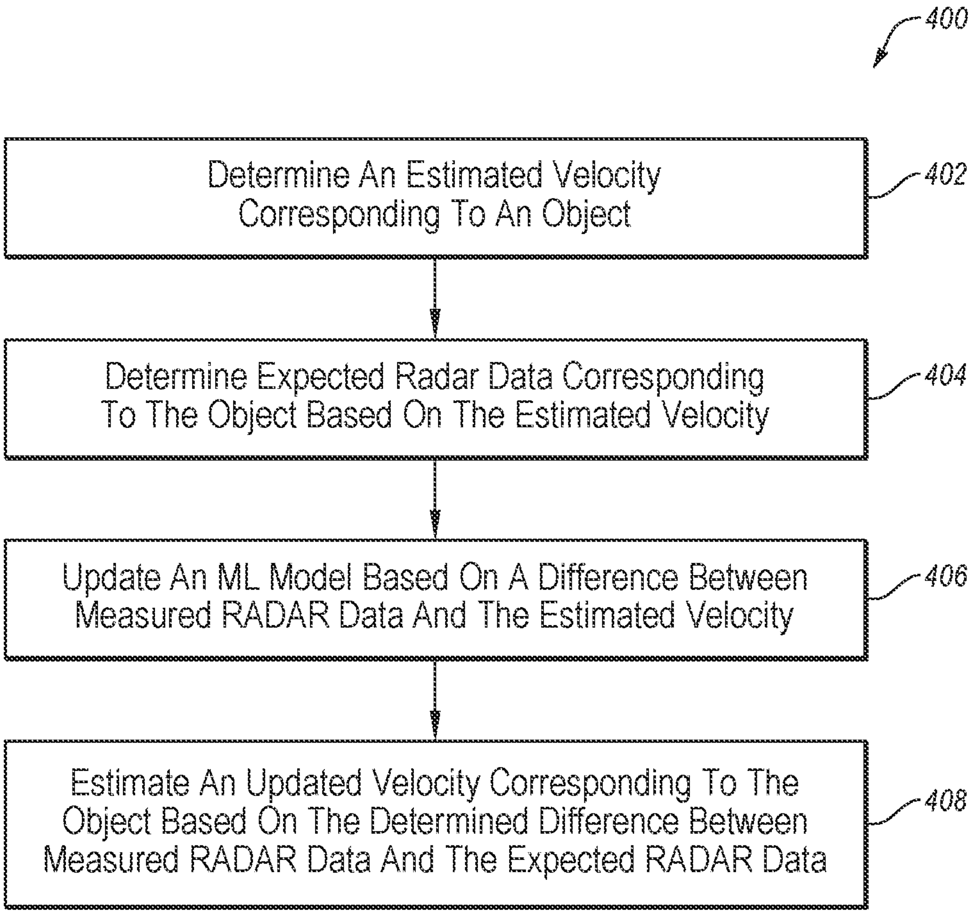
FIG. 4 is a flow diagram showing a method for determining one or more velocity estimates corresponding to an environment, in accordance with one or more embodiments of the present disclosure.

FIG. 4 is a flow diagram showing a method 400 for determining one or more velocity estimates corresponding to an environment, in accordance with one or more embodiments of the present disclosure. The method 400 may be performed by any suitable system, apparatus, or device using any combination of hardware, firmware, and/or software. For instance, various operations may be carried out by one or more processors executing instructions stored in memory. The operations of the method 400 may also be embodied as computer-usable instructions stored on computer storage media. Additionally or alternatively, one or more of the operations of the method 400 may be provided by a standalone application, a service or hosted service (standalone or in combination with another hosted service), or a plug-in to another product, to name a few.

For example, one or more of the operations of the method 400 may be performed by any suitable system, apparatus, or device associated with the environment 100 of FIG. 1. Further, the one or more operations of the method 400 may be performed by one or more other systems, modules, ML models, etc. such as, for example, the ML system 204, the ML model 206, the RADAR data module 210, the loss module 214 of FIG. 2A and/or the ML model 312, the control module 306, and/or the system 310 of FIG. 3. In these or other embodiments, one or more operations may be performed by one or more computing devices, such as that described in further detail at least with respect to FIG. 7. In these or other embodiments, one or more operations of the method 400 may be performed by a computing system disposed on an ego-machine, such as a vehicle as described at least with respect to FIGS. 6A-6D.

The method 400 may include one or more blocks 402, 404, 406, and 408. Although illustrated with discrete blocks, the operations associated with one or more of the blocks of the method 400 may be divided into additional blocks, combined into fewer blocks, or eliminated, depending on the particular implementation.

At block 402, an estimated velocity may be determined using an ML model. In some embodiments, the estimated velocity may correspond to an object and may be determined based on measured RADAR data that may correspond to one or more RADAR detections associated with the object. For example, sensor data corresponding to the detection points 104 that may be described and/or illustrated further in the present disclosure, such as, for example, with respect to FIG. 1.

In some embodiments, the estimated velocity corresponding to the object may include one or more estimated velocities that may individually correspond to one or more portions of the object. In some embodiments, the estimated velocity may be determined prior to an ability to estimate a velocity corresponding to the object by identifying a plurality of bounding shapes corresponding to the object. The individual bounding shapes may be associated with respective estimations of respective positions corresponding to the object. For example, the velocity data 208 and/or the velocity data 304 generated using the ML model 206 and/or the ML model 312 as described and/or illustrated further in the present disclosure, such as, for example, with respect to FIGS. 2A and 2B.

In some embodiments, the one or more estimated velocities may be associated with one or more objects and/or portions of one or more objects using one or more object tracking techniques. For example, one or more estimated velocities may be determined and/or estimated prior to determining and/or identifying one or more bounding shapes corresponding to the one or more objects in the environment. In some embodiments, once the one or more objects may be detected, the estimated velocities may be associated with the one or more detected objects corresponding to the environment.

At block 404, expected RADAR data may be determined. In some embodiments, the expected RADAR data may correspond to the object and may be determined based on the estimated velocity. In some embodiments, the expected RADAR data may be determined based on one or more respective reverse calculations from the one or more estimated velocities. The reverse calculations described further in the present disclosure, for example, with respect to the expected RADAR data 212 of FIG. 2A.

At block 406, the ML model may be updated based on the difference between measured RADAR data and the expected RADAR data. In some embodiments, the ML model may be updated to iteratively generate one or more additional estimated velocities until the difference between the measured RADAR data and the expected RADAR data reaches a particular threshold. In some embodiments, the measured RADAR data may correspond to two or more RADAR sensors.

At block 408, an updated velocity corresponding to the object may be estimated based on the determined difference between the expected RADAR data and the measured RADAR data.

Modifications, additions, or omissions may be made to the method 400 and/or one or more operations included in the method 400 without departing from the scope of the present disclosure. For example, the operations corresponding to the method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

Figure 5:
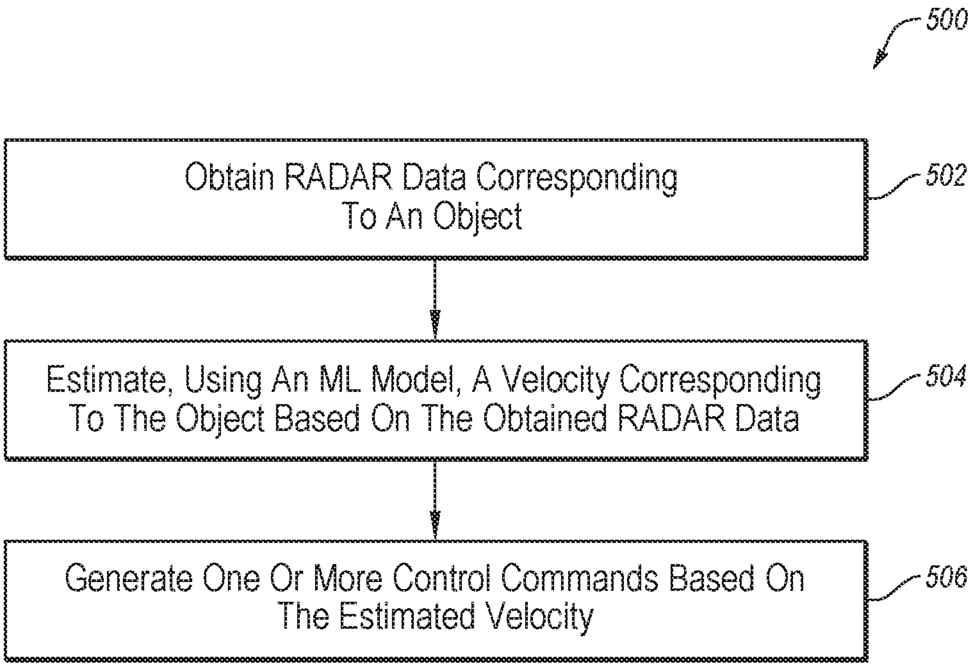
FIG. 5 is a flow diagram showing a method for performing one or more operations in response to estimating velocity using one or more ML models, in accordance with one or more embodiments of the present disclosure.

FIG. 5 is a flow diagram showing a method 500 for performing one or more operations in response to estimating velocity using one or more ML models, in accordance with one or more embodiments of the present disclosure. The method 500 may be performed by any suitable system, apparatus, or device using any combination of hardware, firmware, and/or software. For instance, various operations may be carried out by one or more processors executing instructions stored in memory. The operations of the method 500 may also be embodied as computer-usable instructions stored on computer storage media. Additionally or alternatively, one or more of the operations of the method 500 may be provided by a standalone application, a service or hosted service (standalone or in combination with another hosted service), or a plug-in to another product, to name a few.

For example, one or more of the operations of the method 500 may be performed by any suitable system, apparatus, or device associated with the environment 100 of FIG. 1. Further, the one or more operations of the method 400 may be performed by one or more other systems, modules, ML models, etc. such as, for example, the ML system 204, the ML model 206, the RADAR data module 210, the loss module 214 of FIG. 2A and/or the ML model 312, the control module 306, and/or the system 310 of FIG. 3. In these or other embodiments, one or more operations may be performed by one or more computing devices, such as that described in further detail at least with respect to FIG. 7. In these or other embodiments, one or more operations of the method 500 may be performed by a computing system disposed on an ego-machine, such as a vehicle as described at least with respect to FIGS. 6A-6D.

The method 500 may include one or more blocks 502, 504, and 506. Although illustrated with discrete blocks, the operations associated with one or more of the blocks of the method 500 may be divided into additional blocks, combined into fewer blocks, or eliminated, depending on the particular implementation.

At block 502, RADAR data corresponding to an object may be obtained. In some embodiments, the obtained RADAR data may include RADAR data corresponding to multiple RADAR sensors where the RADAR data may be captured by the multiple RADAR sensors within a particular time frame. For example, the particular time frame may be within ten milliseconds, twenty milliseconds, thirty milliseconds, forty milliseconds, fifty milliseconds, and other comparable periods of time. In some embodiments, the obtained RADAR data may include the RADAR data 202 and/or the RADAR data 302 that may be described further in the present disclosure such as, for example, with respect to FIGS. 2A and 2B. Further, the RADAR data may be obtained using one or more sensors, such as, for example, the sensors 102 described and/or illustrated further in the present disclosure, such as, for example, with respect to FIG. 1.

At block 504, a velocity corresponding to the object may be estimated using an ML model, such as, for example, the ML model 206 and/or the ML model 312 described and/or illustrated, such as, for example, with respect to FIGS. 2A, 2B, and/or 3. In some embodiments, the velocity may be estimated based on the obtained RADAR data. In some embodiments, the velocity corresponding to the object may be estimated prior to estimating the velocity corresponding to the object using tracking of the object. The tracking of the object may include, for example, determining multiple positions corresponding to the object (e.g., using bounding shapes) and determining velocity based on the change in position corresponding to the object over a period of time.

At block 506, one or more control commands may be generated based on the estimated velocity. The one or more control commands may be generated using, for example, the control module 306 described and/or illustrated further in the present disclosure, such as, for example, with respect to FIG. 3. In some embodiments, the generated control commands may include control signals that may direct one or more systems to perform one or more operations. For example, the control commands may direct a system to adjust a trajectory, accelerate, decelerate, adjust a centerline, remain the same and/or otherwise perform one or more operations. The one or more control commands may be the same as, and/or analogous to, the one or more control commands 308 described and/or illustrated further in the present disclosure, such as, for example, with respect to FIG. 3.

Modifications, additions, or omissions may be made to the method 500 and/or one or more operations included in the method 500 without departing from the scope of the present disclosure. For example, the operations corresponding to the method 500 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

Example Autonomous Vehicle

Figure 6A:
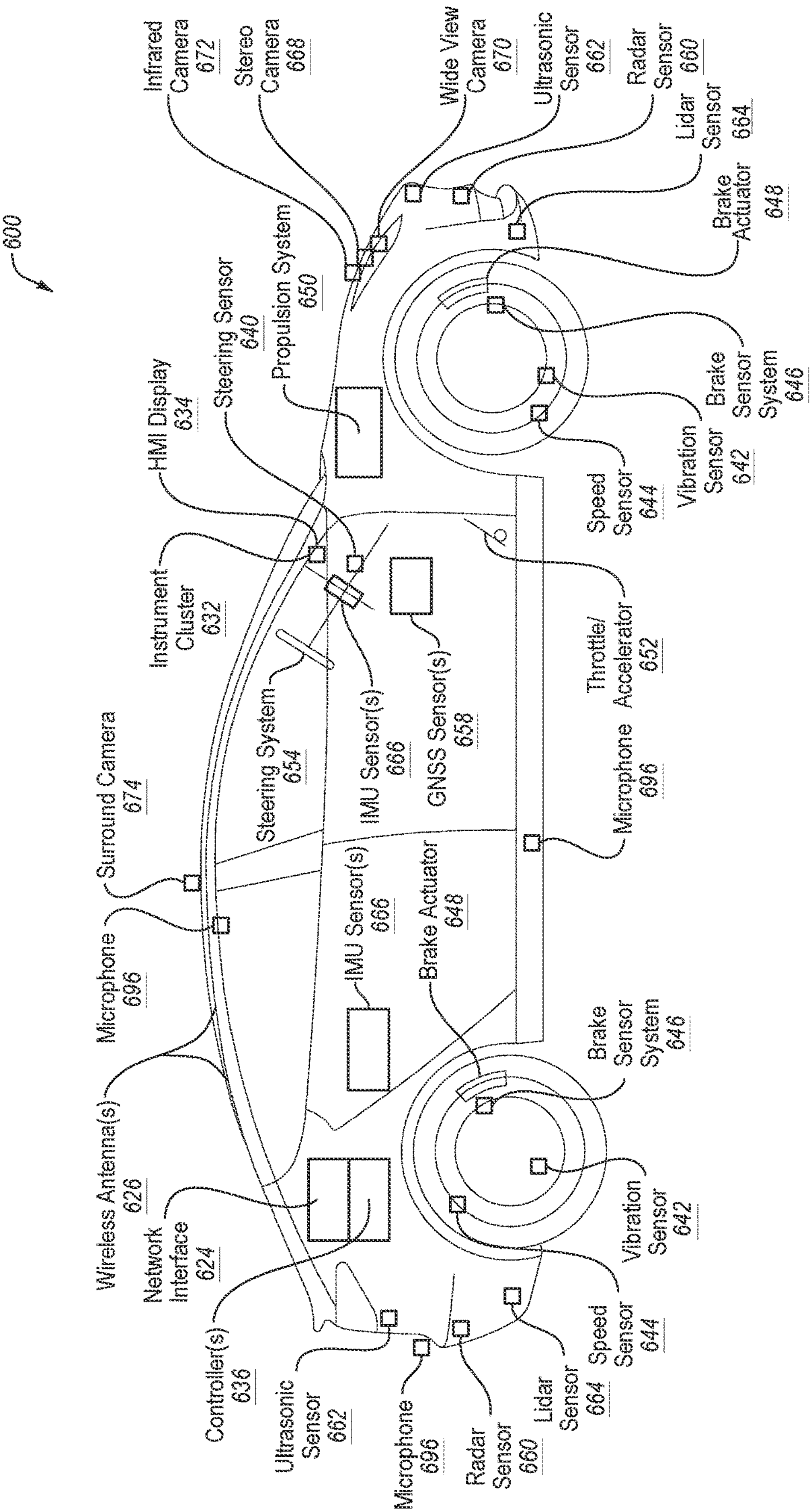
FIG. 6A is an illustration of an example autonomous vehicle, in accordance with some embodiments of the present disclosure.

FIG. 6A is an illustration of an example autonomous vehicle 600, in accordance with some embodiments of the present disclosure. The autonomous vehicle 600 (alternatively referred to herein as the "vehicle 600") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 600 may be capable of functionality in accordance with one or more of Level 3-Level 5 of the autonomous driving levels. The vehicle 600 may be capable of functionality in accordance with one or more of Level 1-Level 5 of the autonomous driving levels. For example, the vehicle 600 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 600 or other machine, such as being fully autonomous, being highly autonomous, being conditionally autonomous, being partially autonomous, providing assistive autonomy, being semi-autonomous, being primarily autonomous, or other designation.

The vehicle 600 may include components such as a chassis, a vehicle body, wheels (e.g., 2, 4, 6, 8, 18, etc.), tires, axles, and other components of a vehicle. The vehicle 600 may include a propulsion system 650, such as an internal combustion engine, hybrid electric power plant, an all-electric engine, and/or another propulsion system type. The propulsion system 650 may be connected to a drive train of the vehicle 600, which may include a transmission, to enable the propulsion of the vehicle 600. The propulsion system 650 may be controlled in response to receiving signals from the throttle/accelerator 652.

A steering system 654, which may include a steering wheel, may be used to steer the vehicle 600 (e.g., along a desired path or route) when the propulsion system 650 is operating (e.g., when the vehicle is in motion). The steering system 654 may receive signals from a steering actuator 656. The steering wheel may be optional for full automation (Level 5) functionality.

The brake sensor system 646 may be used to operate the vehicle brakes in response to receiving signals from the brake actuators 648 and/or brake sensors.

Controller(s) 636, which may include one or more CPU(s), system on chips (SoCs) 604 (FIG. 6C) and/or GPU(s), may provide signals (e.g., representative of commands) to one or more components and/or systems of the vehicle 600. For example, the controller(s) may send signals to operate the vehicle brakes via one or more brake actuators 648, to operate the steering system 654 via one or more steering actuators 656, and/or to operate the propulsion system 650 via one or more throttle/accelerators 652. The controller(s) 636 may include one or more onboard (e.g., integrated) computing devices (e.g., supercomputers) that process sensor signals, and output operation commands (e.g., signals representing commands) to enable autonomous driving and/or to assist a human driver in driving the vehicle 600. The controller(s) 636 may include a first controller 636 for autonomous driving functions, a second controller 636 for functional safety functions, a third controller 636 for artificial intelligence functionality (e.g., computer vision), a fourth controller 636 for infotainment functionality, a fifth controller 636 for redundancy in emergency conditions, and/or other controllers. In some examples, a single controller 636 may handle two or more of the above functionalities, two or more controllers 636 may handle a single functionality, and/or any combination thereof.

The controller(s) 636 may provide the signals for controlling one or more components and/or systems of the vehicle 600 in response to sensor data received from one or more sensors (e.g., sensor inputs). The sensor data may be received from, for example and without limitation, global navigation satellite systems sensor(s) 658 (e.g., Global Positioning System sensor(s)), RADAR sensor(s) 660, ultrasonic sensor(s) 662, LIDAR sensor(s) 664, inertial measurement unit (EIU) sensor(s) 666 (e.g., accelerometer(s), gyroscope(s), magnetic compass(es), magnetometer(s), etc.), microphone(s) 696, stereo camera(s) 668, wide-view camera(s) 670 (e.g., fisheye cameras), infrared camera(s) 672, surround camera(s) 674 (e.g., 360 degree cameras), long-range and/or mid-range camera(s) 698, speed sensor(s) 644 (e.g., for measuring the speed of the vehicle 600), vibration sensor(s) 642, steering sensor(s) 640, brake sensor(s) 646 (e.g., as part of the brake sensor system 646), and/or other sensor types.

One or more of the controller(s) 636 may receive inputs (e.g., represented by input data) from an instrument cluster 632 of the vehicle 600 and provide outputs (e.g., represented by output data, display data, etc.) via a human-machine interface (HMI) display 634, an audible annunciator, a loudspeaker, and/or via other components of the vehicle 600. The outputs may include information such as vehicle velocity, speed, time, map data (e.g., the HD map 622 of FIG. 6C), location data (e.g., the location of the vehicle 600, such as on a map), direction, location of other vehicles (e.g., an occupancy grid), information about objects and status of objects as perceived by the controller(s) 636, etc. For example, the HMI display 634 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 600 further includes a network interface 624, which may use one or more wireless antenna(s) 626 and/or modem(s) to communicate over one or more networks. For example, the network interface 624 may be capable of communication over LTE, WCDMA, UMTS, GSM, CDMA2000, etc. The wireless antenna(s) 626 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 6B:
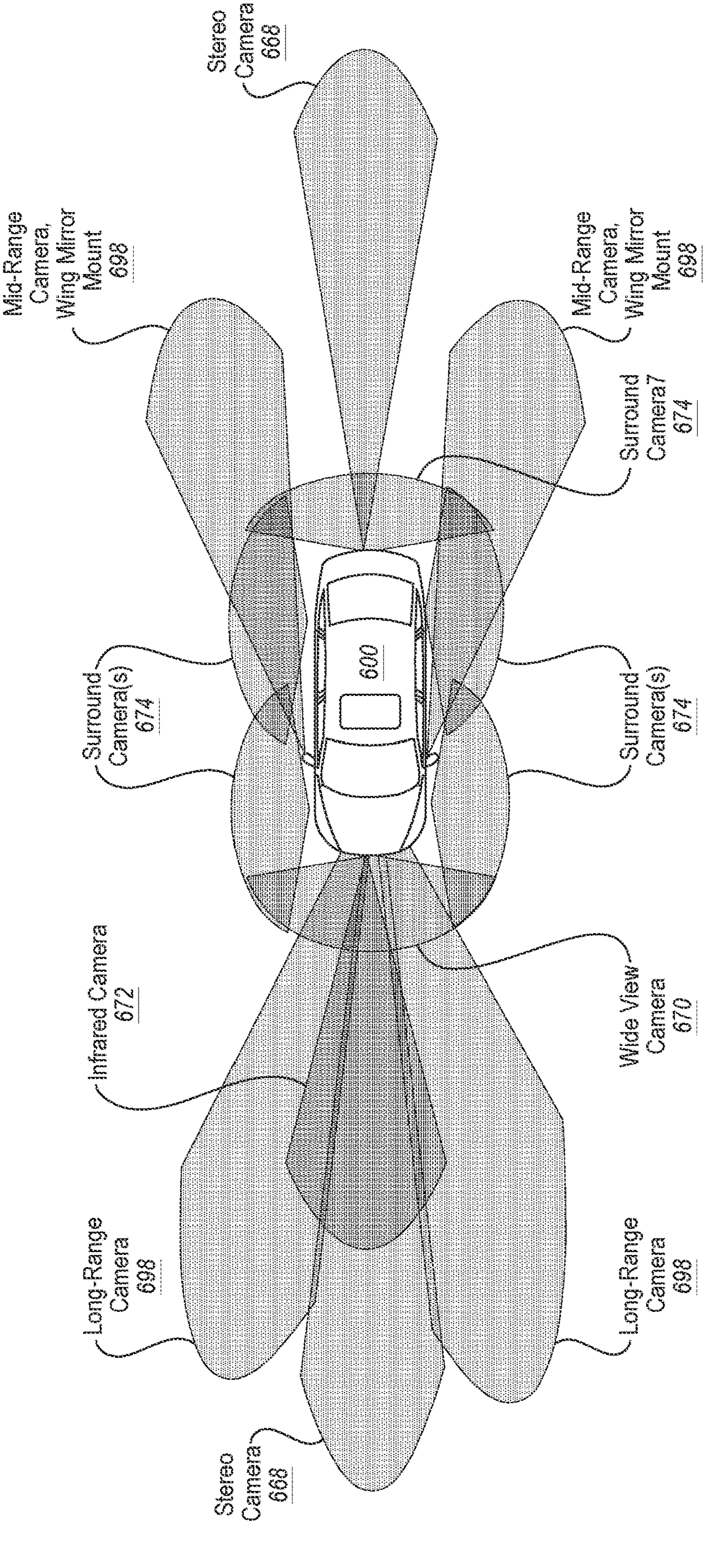
FIG. 6B is an example of camera locations and fields of view for the example autonomous vehicle of FIG. 6A, in accordance with some embodiments of the present disclosure.

FIG. 6B is an example of camera locations and fields of view for the example autonomous vehicle 600 of FIG. 6A, in accordance with some embodiments of the present disclosure. The cameras and respective fields of view are one example embodiment and are not intended to be limiting. For example, additional and/or alternative cameras may be included and/or the cameras may be located at different locations on the vehicle 600.

The camera types for the cameras may include, but are not limited to, digital cameras that may be adapted for use with the components and/or systems of the vehicle 600. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom-designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 600 (e.g., front-facing cameras) may be used for surround view, to help identify forward-facing paths and obstacles, as well aid in, with the help of one or more controllers 636 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 670 that may be used to perceive objects coming into view from the periphery (e.g., pedestrians, crossing traffic or bicycles). Although only one wide-view camera is illustrated in FIG. 6B, there may any number of wide-view cameras 670 on the vehicle 600. In addition, long-range camera(s) 698 (e.g., a long-view stereo camera pair) may be used for depth-based object detection, especially for objects for which a neural network has not yet been trained. The long-range camera(s) 698 may also be used for object detection and classification, as well as basic object tracking.

One or more stereo cameras 668 may also be included in a front-facing configuration. The stereo camera(s) 668 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 668 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 668 may be used in addition to, or alternatively from, those described herein.

Cameras with a field of view that include portions of the environment to the side of the vehicle 600 (e.g., side-view cameras) may be used for surround view, providing information used to create and update the occupancy grid, as well as to generate side impact collision warnings. For example, surround camera(s) 674 (e.g., four surround cameras 674 as illustrated in FIG. 6B) may be positioned to on the vehicle 600. The surround camera(s) 674 may include wide-view camera(s) 670, fisheye camera(s), 360-degree camera(s), and/or the like. For example, four fisheye cameras may be positioned on the vehicle's front, rear, and sides. In an alternative arrangement, the vehicle may use three surround camera(s) 674 (e.g., left, right, and rear), and may leverage one or more other camera(s) (e.g., a forward-facing camera) as a fourth surround-view camera.

Cameras with a field of view that include portions of the environment to the rear of the vehicle 600 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 698, stereo camera(s) 668), infrared camera(s) 672, etc.), as described herein.

Figure 6C:
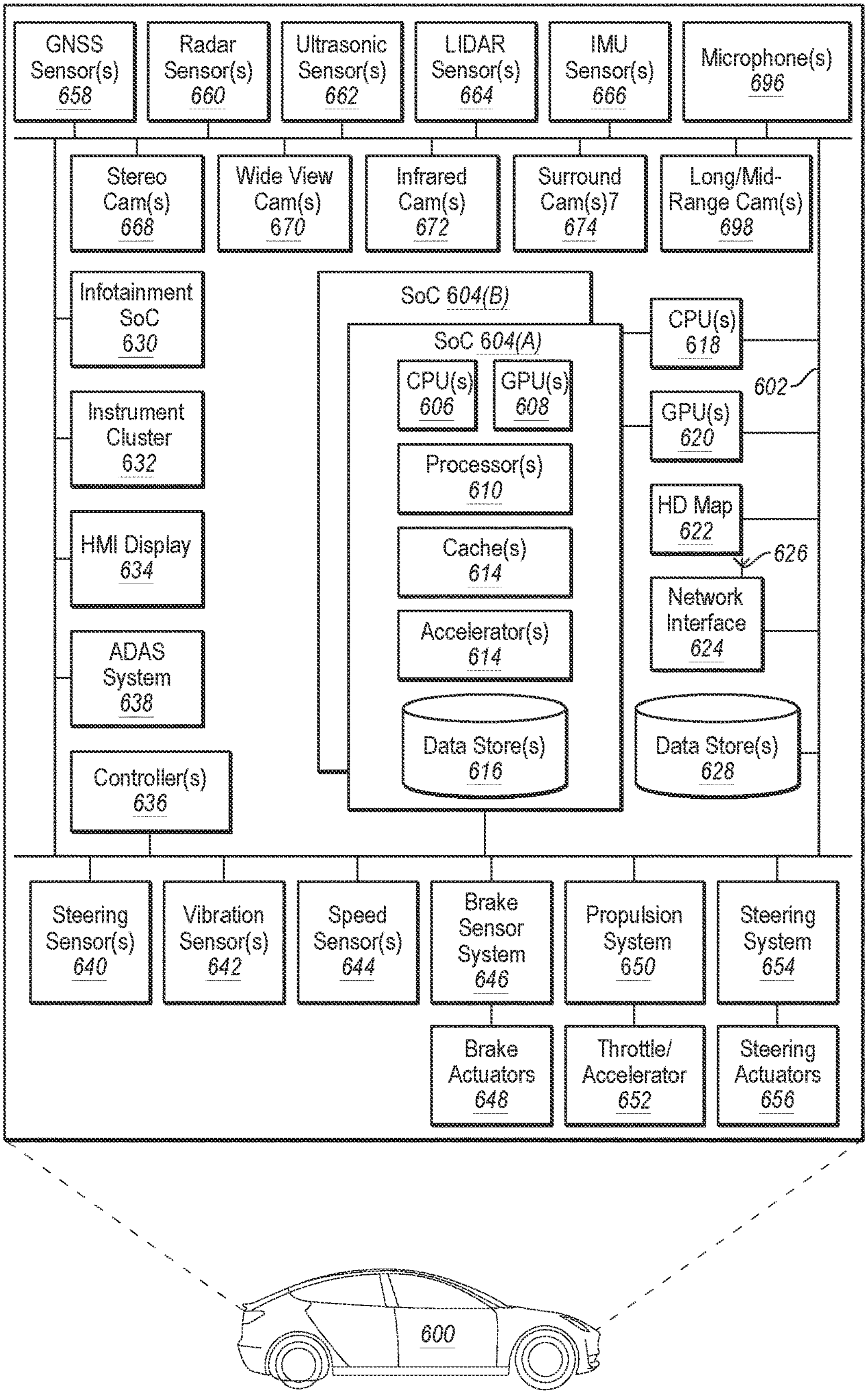
FIG. 6C is a block diagram of an example system architecture for the example autonomous vehicle of FIG. 6A, in accordance with some embodiments of the present disclosure.

FIG. 6C is a block diagram of an example system architecture for the example autonomous vehicle 600 of FIG. 6A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 600 in FIG. 6C is illustrated as being connected via bus 602. The bus 602 may include a Controller Area Network (CAN) data interface (alternatively referred to herein as a "CAN bus"). A CAN may be a network inside the vehicle 600 used to aid in control of various features and functionality of the vehicle 600, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 602 is described herein as being a CAN bus, this is not intended to be limiting. For example, in addition to, or alternatively from, the CAN bus, FlexRay and/or Ethernet may be used. Additionally, although a single line is used to represent the bus 602, this is not intended to be limiting. For example, there may be any number of busses 602, which may include one or more CAN busses, one or more FlexRay busses, one or more Ethernet busses, and/or one or more other types of busses using a different protocol. In some examples, two or more busses 602 may be used to perform different functions, and/or may be used for redundancy. For example, a first bus 602 may be used for collision avoidance functionality and a second bus 602 may be used for actuation control. In any example, each bus 602 may communicate with any of the components of the vehicle 600, and two or more busses 602 may communicate with the same components. In some examples, each SoC 604, each controller 636, and/or each computer within the vehicle may have access to the same input data (e.g., inputs from sensors of the vehicle 600), and may be connected to a common bus, such the CAN bus.

The vehicle 600 may include one or more controller(s) 636, such as those described herein with respect to FIG. 6A. The controller(s) 636 may be used for a variety of functions. The controller(s) 636 may be coupled to any of the various other components and systems of the vehicle 600 and may be used for control of the vehicle 600, artificial intelligence of the vehicle 600, infotainment for the vehicle 600, and/or the like.

The vehicle 600 may include a system(s) on a chip (SoC) 604. The SoC 604 may include CPU(s) 606, GPU(s) 608, processor(s) 610, cache(s) 612, accelerator(s) 614, data store(s) 616, and/or other components and features not illustrated. The SoC(s) 604 may be used to control the vehicle 600 in a variety of platforms and systems. For example, the SoC(s) 604 may be combined in a system (e.g., the system of the vehicle 600) with an HD map 622 which may obtain map refreshes and/or updates via a network interface 624 from one or more servers (e.g., server(s) 678 of FIG. 6D).

The CPU(s) 606 may include a CPU cluster or CPU complex (alternatively referred to herein as a "CCPLEX"). The CPU(s) 606 may include multiple cores and/or L2 caches. For example, in some embodiments, the CPU(s) 606 may include eight cores in a coherent multi-processor configuration. In some embodiments, the CPU(s) 606 may include four dual-core clusters where each cluster has a dedicated L2 cache (e.g., a 2 MB L2 cache). The CPU(s) 606 (e.g., the CCPLEX) may be configured to support simultaneous cluster operation enabling any combination of the clusters of the CPU(s) 606 to be active at any given time.

The CPU(s) 606 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 606 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 608 may include an integrated GPU (alternatively referred to herein as an "iGPU"). The GPU(s) 608 may be programmable and may be efficient for parallel workloads. The GPU(s) 608, in some examples, may use an enhanced tensor instruction set. The GPU(s) 608 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 608 may include at least eight streaming microprocessors. The GPU(s) 608 may use compute application programming interface(s) (API(s)). In addition, the GPU(s) 608 may use one or more parallel computing platforms and/or programming models (e.g., NVIDIA's CUDA).

The GPU(s) 608 may be power-optimized for best performance in automotive and embedded use cases. For example, the GPU(s) 608 may be fabricated on a Fin field-effect transistor (FinFET). However, this is not intended to be limiting, and the GPU(s) 608 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread-scheduling capability to enable finer-grain synchronization and cooperation between parallel threads. The streaming microprocessors may include a combined L1 data cache and shared memory unit in order to improve performance while simplifying programming.

The GPU(s) 608 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 608 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 608 to access the CPU(s) 606 page tables directly. In such examples, when the GPU(s) 608 memory management unit (MMU) experiences a miss, an address translation request may be transmitted to the CPU(s) 606. In response, the CPU(s) 606 may look in its page tables for the virtual-to-physical mapping for the address and transmits the translation back to the GPU(s) 608. As such, unified memory technology may allow a single unified virtual address space for memory of both the CPU(s) 606 and the GPU(s) 608, thereby simplifying the GPU(s) 608 programming and porting of applications to the GPU(s) 608.

In addition, the GPU(s) 608 may include an access counter that may keep track of the frequency of access of the GPU(s) 608 to memory of other processors. The access counter may help ensure that memory pages are moved to the physical memory of the processor that is accessing the pages most frequently.

The SoC(s) 604 may include any number of cache(s) 612, including those described herein. For example, the cache(s) 612 may include an L3 cache that is available to both the CPU(s) 606 and the GPU(s) 608 (e.g., that is connected to both the CPU(s) 606 and the GPU(s) 608). The cache(s) 612 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 604 may include an arithmetic logic unit(s) (ALU(s)) which may be leveraged in performing processing with respect to any of the variety of tasks or operations of the vehicle 600—such as processing DNNs. In addition, the SoC(s) 604 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 606 and/or GPU(s) 608.

The SoC(s) 604 may include one or more accelerators 614 (e.g., hardware accelerators, software accelerators, or a combination thereof). For example, the SoC(s) 604 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 608 and to off-load some of the tasks of the GPU(s) 608 (e.g., to free up more cycles of the GPU(s) 608 for performing other tasks). As an example, the accelerator(s) 614 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 614 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 608, and by using an inference accelerator, for example, a designer may target either the DLA(s) or the GPU(s) 608 for any function. For example, the designer may focus processing of CNNs and floating point operations on the DLA(s) and leave other functions to the GPU(s) 608 and/or other accelerator(s) 614.

The accelerator(s) 614 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 606. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 614 (e.g., the hardware acceleration cluster) may include a computer vision network on-chip and SRAM, for providing a high-bandwidth, low latency SRAM for the accelerator(s) 614. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 604 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 614 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to processed RADAR. In other examples, the PVA is used for time of flight depth processing, by processing raw time of flight data to provide processed time of flight data, for example.

The DLA may be used to run any type of network to enhance control and driving safety, including, for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 666 output that correlates with the vehicle 600 orientation, distance, 3D location estimates of the object obtained from the neural network and/or other sensors (e.g., LIDAR sensor(s) 664 or RADAR sensor(s) 660), among others.

The SoC(s) 604 may include data store(s) 616 (e.g., memory). The data store(s) 616 may be on-chip memory of the SoC(s) 604, which may store neural networks to be executed on the GPU and/or the DLA. In some examples, the data store(s) 616 may be large enough in capacity to store multiple instances of neural networks for redundancy and safety. The data store(s) 616 may comprise L2 or L3 cache(s) 612. Reference to the data store(s) 616 may include reference to the memory associated with the PVA, DLA, and/or other accelerator(s) 614, as described herein.

The SoC(s) 604 may include one or more processor(s) 610 (e.g., embedded processors). The processor(s) 610 may include a boot and power management processor that may be a dedicated processor and subsystem to handle boot power and management functions and related security enforcement. The boot and power management processor may be a part of the SoC(s) 604 boot sequence and may provide runtime power management services. The boot power and management processor may provide clock and voltage programming, assistance in system low power state transitions, management of SoC(s) 604 thermals and temperature sensors, and/or management of the SoC(s) 604 power states. Each temperature sensor may be implemented as a ring-oscillator whose output frequency is proportional to temperature, and the SoC(s) 604 may use the ring-oscillators to detect temperatures of the CPU(s) 606, GPU(s) 608, and/or accelerator(s) 614. If temperatures are determined to exceed a threshold, the boot and power management processor may enter a temperature fault routine and put the SoC(s) 604 into a lower power state and/or put the vehicle 600 into a chauffeur to safe-stop mode (e.g., bring the vehicle 600 to a safe stop).

The processor(s) 610 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 610 may further include an always-on processor engine that may provide necessary hardware features to support low power sensor management and wake use cases. The always-on processor engine may include a processor core, a tightly coupled RAM, supporting peripherals (e.g., timers and interrupt controllers), various I/O controller peripherals, and routing logic.

The processor(s) 610 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 610 may further include a real-time camera engine that may include a dedicated processor subsystem for handling real-time camera management.

The processor(s) 610 may further include a high dynamic range signal processor that may include an image signal processor that is a hardware engine that is part of the camera processing pipeline.

The processor(s) 610 may include a video image compositor that may be a processing block (e.g., implemented on a microprocessor) that implements video post-processing functions needed by a video playback application to produce the final image for the player window. The video image compositor may perform lens distortion correction on wide-view camera(s) 670, surround camera(s) 674, and/or on in-cabin monitoring camera sensors. An in-cabin monitoring camera sensor is preferably monitored by a neural network running on another instance of the Advanced SoC, configured to identify in-cabin events and respond accordingly. In-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 608 is not required to continuously render new surfaces. Even when the GPU(s) 608 is powered on and active doing 3D rendering, the video image compositor may be used to offload the GPU(s) 608 to improve performance and responsiveness.

The SoC(s) 604 may further include a mobile industry processor interface (MIPI) camera serial interface for receiving video and input from cameras, a high-speed interface, and/or a video input block that may be used for camera and related pixel input functions. The SoC(s) 604 may further include an input/output controller(s) that may be controlled by software and may be used for receiving I/O signals that are uncommitted to a specific role.

The SoC(s) 604 may further include a broad range of peripheral interfaces to enable communication with peripherals, audio codecs, power management, and/or other devices. The SoC(s) 604 may be used to process data from cameras (e.g., connected over Gigabit Multimedia Serial Link and Ethernet), sensors (e.g., LIDAR sensor(s) 664, RADAR sensor(s) 660, etc. that may be connected over Ethernet), data from bus 602 (e.g., speed of vehicle 600, steering wheel position, etc.), data from GNSS sensor(s) 658 (e.g., connected over Ethernet or CAN bus). The SoC(s) 604 may further include dedicated high-performance mass storage controllers that may include their own DMA engines, and that may be used to free the CPU(s) 606 from routine data management tasks.

The SoC(s) 604 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 604 may be faster, more reliable, and even more energy-efficient and space-efficient than conventional systems. For example, the accelerator(s) 614, when combined with the CPU(s) 606, the GPU(s) 608, and the data store(s) 616, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 620) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path-planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path-planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 608.

In some examples, a CNN for facial recognition and vehicle owner identification may use data from camera sensors to identify the presence of an authorized driver and/or owner of the vehicle 600. The always-on sensor processing engine may be used to unlock the vehicle when the owner approaches the driver door and turn on the lights, and, in security mode, to disable the vehicle when the owner leaves the vehicle. In this way, the SoC(s) 604 provide for security against theft and/or carjacking.

In another example, a CNN for emergency vehicle detection and identification may use data from microphones 696 to detect and identify emergency vehicle sirens. In contrast to conventional systems, that use general classifiers to detect sirens and manually extract features, the SoC(s) 604 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 658. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 662, until the emergency vehicle(s) passes.

The vehicle may include a CPU(s) 618 (e.g., discrete CPU(s), or dCPU(s)), that may be coupled to the SoC(s) 604 via a high-speed interconnect (e.g., PCIe). The CPU(s) 618 may include an X86 processor, for example. The CPU(s) 618 may be used to perform any of a variety of functions, including arbitrating potentially inconsistent results between ADAS sensors and the SoC(s) 604, and/or monitoring the status and health of the controller(s) 636 and/or infotainment SoC 630, for example.

The vehicle 600 may include a GPU(s) 620 (e.g., discrete GPU(s), or dGPU(s)), that may be coupled to the SoC(s) 604 via a high-speed interconnect (e.g., NVIDIA's NVLINK). The GPU(s) 620 may provide additional artificial intelligence functionality, such as by executing redundant and/or different neural networks, and may be used to train and/or update neural networks based on input (e.g., sensor data) from sensors of the vehicle 600.

The vehicle 600 may further include the network interface 624 which may include one or more wireless antennas 626 (e.g., one or more wireless antennas for different communication protocols, such as a cellular antenna, a Bluetooth antenna, etc.). The network interface 624 may be used to enable wireless connectivity over the Internet with the cloud (e.g., with the server(s) 678 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 600 information about vehicles in proximity to the vehicle 600 (e.g., vehicles in front of, on the side of, and/or behind the vehicle 600). This functionality may be part of a cooperative adaptive cruise control functionality of the vehicle 600.

The network interface 624 may include a SoC that provides modulation and demodulation functionality and enables the controller(s) 636 to communicate over wireless networks. The network interface 624 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 600 may further include data store(s) 628, which may include off-chip (e.g., off the SoC(s) 604) storage. The data store(s) 628 may include one or more storage elements including RAM, SRAM, DRAM, VRAM, Flash, hard disks, and/or other components and/or devices that may store at least one bit of data.

The vehicle 600 may further include GNSS sensor(s) 658. The GNSS sensor(s) 658 (e.g., GPS, assisted GPS sensors, differential GPD (DGPS) sensors, etc.), to assist in mapping, perception, occupancy grid generation, and/or path planning functions. Any number of GNSS sensor(s) 658 may be used, including, for example and without limitation, a GPS using a USB connector with an Ethernet to Serial (RS-232) bridge.

The vehicle 600 may further include RADAR sensor(s) 660. The RADAR sensor(s) 660 may be used by the vehicle 600 for long-range vehicle detection, even in darkness and/or severe weather conditions. RADAR functional safety levels may be ASIL B. The RADAR sensor(s) 660 may use the CAN and/or the bus 602 (e.g., to transmit data generated by the RADAR sensor(s) 660) for control and to access object tracking data, with access to Ethernet to access raw data, in some examples. A wide variety of RADAR sensor types may be used. For example, and without limitation, the RADAR sensor(s) 660 may be suitable for front, rear, and side RADAR use. In some example, Pulse Doppler RADAR sensor(s) are used.

The RADAR sensor(s) 660 may include different configurations, such as long-range with narrow field of view, short-range with wide field of view, short-range side coverage, etc. In some examples, long-range RADAR may be used for adaptive cruise control functionality. The long-range RADAR systems may provide a broad field of view realized by two or more independent scans, such as within a 250 m range. The RADAR sensor(s) 660 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 600 surrounding at higher speeds with minimal interference from traffic in adjacent lanes. The other two antennae may expand the field of view, making it possible to quickly detect vehicles entering or leaving the vehicle's 600 lane.

Mid-range RADAR systems may include, as an example, a range of up to 160 m (front) or 80 m (rear), and a field of view of up to 42 degrees (front) or 150 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 600 may further include ultrasonic sensor(s) 662. The ultrasonic sensor(s) 662, which may be positioned at the front, back, and/or the sides of the vehicle 600, may be used for park assist and/or to create and update an occupancy grid. A wide variety of ultrasonic sensor(s) 662 may be used, and different ultrasonic sensor(s) 662 may be used for different ranges of detection (e.g., 2.5 m, 4 m). The ultrasonic sensor(s) 662 may operate at functional safety levels of ASIL B.

The vehicle 600 may include LIDAR sensor(s) 664. The LIDAR sensor(s) 664 may be used for object and pedestrian detection, emergency braking, collision avoidance, and/or other functions. The LIDAR sensor(s) 664 may be functional safety level ASIL B. In some examples, the vehicle 600 may include multiple LIDAR sensors 664 (e.g., two, four, six, etc.) that may use Ethernet (e.g., to provide data to a Gigabit Ethernet switch).

In some examples, the LIDAR sensor(s) 664 may be capable of providing a list of objects and their distances for a 360-degree field of view. Commercially available LIDAR sensor(s) 664 may have an advertised range of approximately 100 m, with an accuracy of 2 cm-3 cm, and with support for a 100 Mbps Ethernet connection, for example. In some examples, one or more non-protruding LIDAR sensors 664 may be used. In such examples, the LIDAR sensor(s) 664 may be implemented as a small device that may be embedded into the front, rear, sides, and/or corners of the vehicle 600. The LIDAR sensor(s) 664, in such examples, may provide up to a 120-degree horizontal and 35-degree vertical field-of-view, with a 200 m range even for low-reflectivity objects. Front-mounted LIDAR sensor(s) 664 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 600. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 664 may be less susceptible to motion blur, vibration, and/or shock.

The vehicle may further include IMU sensor(s) 666. The IMU sensor(s) 666 may be located at a center of the rear axle of the vehicle 600, in some examples. The IMU sensor(s) 666 may include, for example and without limitation, an accelerometer(s), a magnetometer(s), a gyroscope(s), a magnetic compass(es), and/or other sensor types. In some examples, such as in six-axis applications, the IMU sensor(s) 666 may include accelerometers and gyroscopes, while in nine-axis applications, the IMU sensor(s) 666 may include accelerometers, gyroscopes, and magnetometers.

In some embodiments, the IMU sensor(s) 666 may be implemented as a miniature, high-performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 666 may enable the vehicle 600 to estimate heading without requiring input from a magnetic sensor by directly observing and correlating the changes in velocity from GPS to the IMU sensor(s) 666. In some examples, the IMU sensor(s) 666 and the GNSS sensor(s) 658 may be combined in a single integrated unit.

The vehicle may include microphone(s) 696 placed in and/or around the vehicle 600. The microphone(s) 696 may be used for emergency vehicle detection and identification, among other things.

The vehicle may further include any number of camera types, including stereo camera(s) 668, wide-view camera(s) 670, infrared camera(s) 672, surround camera(s) 674, long-range and/or mid-range camera(s) 698, and/or other camera types. The cameras may be used to capture image data around an entire periphery of the vehicle 600. The types of cameras used depends on the embodiments and requirements for the vehicle 600, and any combination of camera types may be used to provide the necessary coverage around the vehicle 600. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 6A and FIG. 6B.

The vehicle 600 may further include vibration sensor(s) 642. The vibration sensor(s) 642 may measure vibrations of components of the vehicle, such as the axle(s). For example, changes in vibrations may indicate a change in road surfaces. In another example, when two or more vibration sensors 642 are used, the differences between the vibrations may be used to determine friction or slippage of the road surface (e.g., when the difference in vibration is between a power-driven axle and a freely rotating axle).

The vehicle 600 may include an ADAS system 638. The ADAS system 638 may include a SoC, in some examples. The ADAS system 638 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 660, LIDAR sensor(s) 664, and/or a camera(s). The ACC systems may include longitudinal ACC and/or lateral ACC. Longitudinal ACC monitors and controls the distance to the vehicle immediately ahead of the vehicle 600 and automatically adjust the vehicle speed to maintain a safe distance from vehicles ahead. Lateral ACC performs distance keeping, and advises the vehicle 600 to change lanes when necessary. Lateral ACC is related to other ADAS applications such as LCA and CWS.

CACC uses information from other vehicles that may be received via the network interface 624 and/or the wireless antenna(s) 626 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 600), while the I2V communication concept provides information about traffic further ahead. CACC systems may include either or both I2V and V2V information sources. Given the information of the vehicles ahead of the vehicle 600, CACC may be more reliable, and it has potential to improve traffic flow smoothness and reduce congestion on the road.

FCW systems are designed to alert the driver to a hazard, so that the driver may take corrective action. FCW systems use a front-facing camera and/or RADAR sensor(s) 660, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 660, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 600 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 600 if the vehicle 600 starts to exit the lane. BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s).

RCTW systems may provide visual, audible, and/or tactile notification when an object is detected outside the rear-camera range when the vehicle 600 is backing up. Some RCTW systems include AEB to ensure that the vehicle brakes are applied to avoid a crash. RCTW systems may use one or more rear-facing RADAR sensor(s) 660, coupled to a dedicated processor, DSP, FPGA, and/or ASIC, that is electrically coupled to driver feedback, such as a display, speaker, and/or vibrating component.

Conventional ADAS systems may be prone to false positive results, which may be annoying and distracting to a driver, but typically are not catastrophic, because the ADAS systems alert the driver and allow the driver to decide whether a safety condition truly exists and act accordingly. However, in an autonomous vehicle 600, the vehicle 600 itself must, in the case of conflicting results, decide whether to heed the result from a primary computer or a secondary computer (e.g., a first controller 636 or a second controller 636). For example, in some embodiments, the ADAS system 638 may be a backup and/or secondary computer for providing perception information to a backup computer rationality module. The backup computer rationality monitor may run a redundant diverse software on hardware components to detect faults in perception and dynamic driving tasks. Outputs from the ADAS system 638 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 604.

In other examples, ADAS system 638 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 638 may be fed into the primary computer's perception block and/or the primary computer's dynamic driving task block. For example, if the ADAS system 638 indicates a forward crash warning due to an object immediately ahead, the perception block may use this information when identifying objects. In other examples, the secondary computer may have its own neural network that is trained and thus reduces the risk of false positives, as described herein.

The vehicle 600 may further include the infotainment SoC 630 (e.g., an in-vehicle infotainment system (IVI)). Although illustrated and described as an SoC, the infotainment system may not be a SoC, and may include two or more discrete components. The infotainment SoC 630 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle-related information such as fuel level, total distance covered, brake fuel level, oil level, door open/close, air filter information, etc.) to the vehicle 600. For example, the infotainment SoC 630 may include radios, disk players, navigation systems, video players, USB and Bluetooth connectivity, carputers, in-car entertainment, Wi-Fi, steering wheel audio controls, hands-free voice control, a heads-up display (HUD), an HMI display 634, a telematics device, a control panel (e.g., for controlling and/or interacting with various components, features, and/or systems), and/or other components. The infotainment SoC 630 may further be used to provide information (e.g., visual and/or audible) to a user(s) of the vehicle, such as information from the ADAS system 638, autonomous driving information such as planned vehicle maneuvers, trajectories, surrounding environment information (e.g., intersection information, vehicle information, road information, etc.), and/or other information.

The infotainment SoC 630 may include GPU functionality. The infotainment SoC 630 may communicate over the bus 602 (e.g., CAN bus, Ethernet, etc.) with other devices, systems, and/or components of the vehicle 600. In some examples, the infotainment SoC 630 may be coupled to a supervisory MCU such that the GPU of the infotainment system may perform some self-driving functions in the event that the primary controller(s) 636 (e.g., the primary and/or backup computers of the vehicle 600) fail. In such an example, the infotainment SoC 630 may put the vehicle 600 into a chauffeur to safe-stop mode, as described herein.

The vehicle 600 may further include an instrument cluster 632 (e.g., a digital dash, an electronic instrument cluster, a digital instrument panel, etc.). The instrument cluster 632 may include a controller and/or supercomputer (e.g., a discrete controller or supercomputer). The instrument cluster 632 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 630 and the instrument cluster 632. In other words, the instrument cluster 632 may be included as part of the infotainment SoC 630, or vice versa.

Figure 6D:
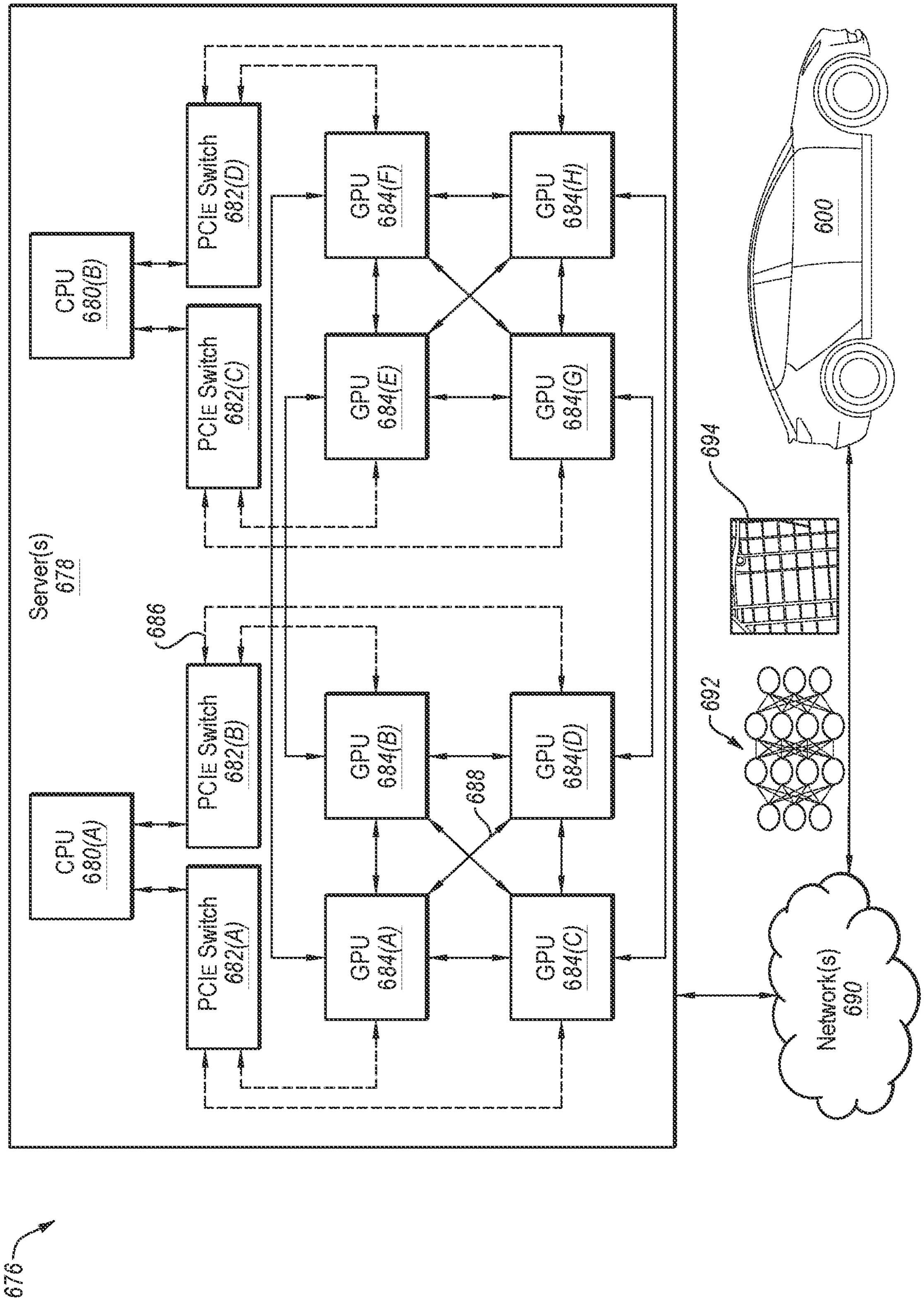
FIG. 6D is a system diagram for communication between cloud-based server(s) and the example autonomous vehicle of FIG. 6A, in accordance with some embodiments of the present disclosure.

FIG. 6D is a system diagram for communication between cloud-based server(s) and the example autonomous vehicle 600 of FIG. 6A, in accordance with some embodiments of the present disclosure. The system 676 may include server(s) 678, network(s) 690, and vehicles, including the vehicle 600. The server(s) 678 may include a plurality of GPUs 684(A)-684(H) (collectively referred to herein as GPUs 684), PCIe switches 682(A)-682(H) (collectively referred to herein as PCIe switches 682), and/or CPUs 680(A)-680(B) (collectively referred to herein as CPUs 680).

The GPUs 684, the CPUs 680, and the PCIe switches may be interconnected with high-speed interconnects such as, for example and without limitation, NVLink interfaces 688 developed by NVIDIA and/or PCIe connections 686. In some examples, the GPUs 684 are connected via NVLink and/or NVSwitch SoC and the GPUs 684 and the PCIe switches 682 are connected via PCIe interconnects. Although eight GPUs 684, two CPUs 680, and two PCIe switches are illustrated, this is not intended to be limiting. Depending on the embodiment, each of the server(s) 678 may include any number of GPUs 684, CPUs 680, and/or PCIe switches. For example, the server(s) 678 may each include eight, sixteen, thirty-two, and/or more GPUs 684.

The server(s) 678 may receive, over the network(s) 690 and from the vehicles, image data representative of images showing unexpected or changed road conditions, such as recently commenced road work. The server(s) 678 may transmit, over the network(s) 690 and to the vehicles, neural networks 692, updated neural networks 692, and/or map information 694, including information regarding traffic and road conditions. The updates to the map information 694 may include updates for the HD map 622, such as information regarding construction sites, potholes, detours, flooding, and/or other obstructions. In some examples, the neural networks 692, the updated neural networks 692, and/or the map information 694 may have resulted from new training and/or experiences represented in data received from any number of vehicles in the environment, and/or based on training performed at a datacenter (e.g., using the server(s) 678 and/or other servers).

The server(s) 678 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 690, and/or the machine learning models may be used by the server(s) 678 to remotely monitor the vehicles.

In some examples, the server(s) 678 may receive data from the vehicles and apply the data to up-to-date real-time neural networks for real-time intelligent inferencing. The server(s) 678 may include deep-learning supercomputers and/or dedicated AI computers powered by GPU(s) 684, such as a DGX and DGX Station machines developed by NVIDIA. However, in some examples, the server(s) 678 may include deep learning infrastructure that use only CPU-powered datacenters.

The deep-learning infrastructure of the server(s) 678 may be capable of fast, real-time inferencing, and may use that capability to evaluate and verify the health of the processors, software, and/or associated hardware in the vehicle 600. For example, the deep-learning infrastructure may receive periodic updates from the vehicle 600, such as a sequence of images and/or objects that the vehicle 600 has located in that sequence of images (e.g., via computer vision and/or other machine learning object classification techniques). The deep-learning infrastructure may run its own neural network to identify the objects and compare them with the objects identified by the vehicle 600 and, if the results do not match and the infrastructure concludes that the AI in the vehicle 600 is malfunctioning, the server(s) 678 may transmit a signal to the vehicle 600 instructing a fail-safe computer of the vehicle 600 to assume control, notify the passengers, and complete a safe parking maneuver.

For inferencing, the server(s) 678 may include the GPU(s) 684 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 7:
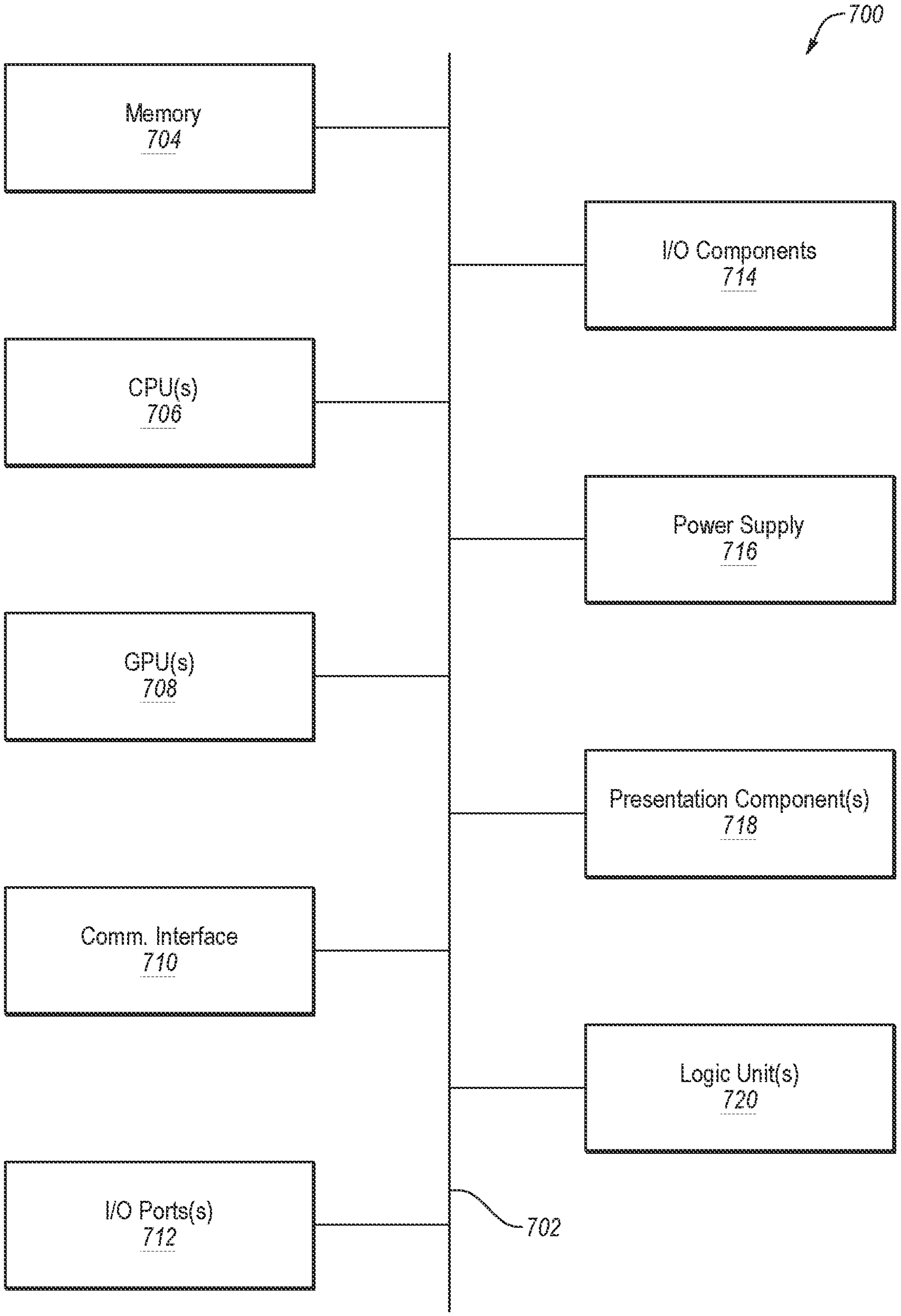
FIG. 7 is a block diagram of an example computing device suitable for use in implementing some embodiments of the present disclosure.

FIG. 7 is a block diagram of an example computing device(s) 700 suitable for use in implementing some embodiments of the present disclosure. Computing device 700 may include an interconnect system 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, one or more presentation components 718 (e.g., display(s)), and one or more logic units 720. In at least one embodiment, the computing device(s) 700 may comprise one or more virtual machines (VMs), and/or any of the components thereof may comprise virtual components (e.g., virtual hardware components). For non-limiting examples, one or more of the GPUs 708 may comprise one or more vGPUs, one or more of the CPUs 706 may comprise one or more vCPUs, and/or one or more of the logic units 720 may comprise one or more virtual logic units. As such, a computing device(s) 700 may include discrete components (e.g., a full GPU dedicated to the computing device 700), virtual components (e.g., a portion of a GPU dedicated to the computing device 700), or a combination thereof.

Although the various blocks of FIG. 7 are shown as connected via the interconnect system 702 with lines, this is not intended to be limiting and is for clarity only. For example, in some embodiments, a presentation component 718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The interconnect system 702 may represent one or more links or busses, such as an address bus, a data bus, a control bus, or a combination thereof. The interconnect system 702 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 706 may be directly connected to the memory 704. Further, the CPU 706 may be directly connected to the GPU 708. Where there is direct, or point-to-point, connection between components, the interconnect system 702 may include a PCIe link to carry out the connection. In these examples, a PCI bus need not be included in the computing device 700.

The memory 704 may include any of a variety of computer-readable media. The computer-readable media may be any available media that may be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 700. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 706 may be configured to execute at least some of the computer-readable instructions to control one or more components of the computing device 700 to perform one or more of the methods and/or processes described herein. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of computing device 700 implemented (e.g., processors with fewer cores for mobile devices and processors with more cores for servers). For example, depending on the type of computing device 700, the processor may be an Advanced RISC Machines (ARM) processor implemented using Reduced Instruction Set Computing (RISC) or an x86 processor implemented using Complex Instruction Set Computing (CISC). The computing device 700 may include one or more CPUs 706 in addition to one or more microprocessors or supplementary co-processors, such as math co-processors.

In addition to or alternatively from the CPU(s) 706, the GPU(s) 708 may be configured to execute at least some of the computer-readable instructions to control one or more components of the computing device 700 to perform one or more of the methods and/or processes described herein. One or more of the GPU(s) 708 may be an integrated GPU (e.g., with one or more of the CPU(s) 706 and/or one or more of the GPU(s) 708 may be a discrete GPU. In embodiments, one or more of the GPU(s) 708 may be a coprocessor of one or more of the CPU(s) 706. The GPU(s) 708 may be used by the computing device 700 to render graphics (e.g., 3D graphics) or perform general purpose computations. For example, the GPU(s) 708 may be used for General-Purpose computing on GPUs (GPGPU). The GPU(s) 708 may include hundreds or thousands of cores that are capable of handling hundreds or thousands of software threads simultaneously. The GPU(s) 708 may generate pixel data for output images in response to rendering commands (e.g., rendering commands from the CPU(s) 706 received via a host interface). The GPU(s) 708 may include graphics memory, such as display memory, for storing pixel data or any other suitable data, such as GPGPU data. The display memory may be included as part of the memory 704. The GPU(s) 708 may include two or more GPUs operating in parallel (e.g., via a link). The link may directly connect the GPUs (e.g., using NVLINK) or may connect the GPUs through a switch (e.g., using NVSwitch). When combined together, each GPU 708 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 706 and/or the GPU(s) 708, the logic unit(s) 720 may be configured to execute at least some of the computer-readable instructions to control one or more components of the computing device 700 to perform one or more of the methods and/or processes described herein. In embodiments, the CPU(s) 706, the GPU(s) 708, and/or the logic unit(s) 720 may discretely or jointly perform any combination of the methods, processes and/or portions thereof. One or more of the logic units 720 may be part of and/or integrated in one or more of the CPU(s) 706 and/or the GPU(s) 708 and/or one or more of the logic units 720 may be discrete components or otherwise external to the CPU(s) 706 and/or the GPU(s) 708. In embodiments, one or more of the logic units 720 may be a coprocessor of one or more of the CPU(s) 706 and/or one or more of the GPU(s) 708.

Examples of the logic unit(s) 720 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 710 may include one or more receivers, transmitters, and/or transceivers that enable the computing device 700 to communicate with other computing devices via an electronic communication network, include wired and/or wireless communications. The communication interface 710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 720 and/or communication interface 710 may include one or more data processing units (DPUs) to transmit data received over a network and/or through interconnect system 702 directly to (e.g., a memory of) one or more GPU(s) 708.

The I/O ports 712 may enable the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The I/O components 714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail in the present disclosure) associated with a display of the computing device 700. The computing device 700 may include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that enable detection of motion. In some examples, the output of the accelerometers or gyroscopes may be used by the computing device 700 to render immersive augmented reality or virtual reality.

The power supply 716 may include a hard-wired power supply, a battery power supply, or a combination thereof. The power supply 716 may provide power to the computing device 700 to enable the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, etc.), and output the data (e.g., as an image, video, sound, etc.).

Example Data Center

Figure 8:
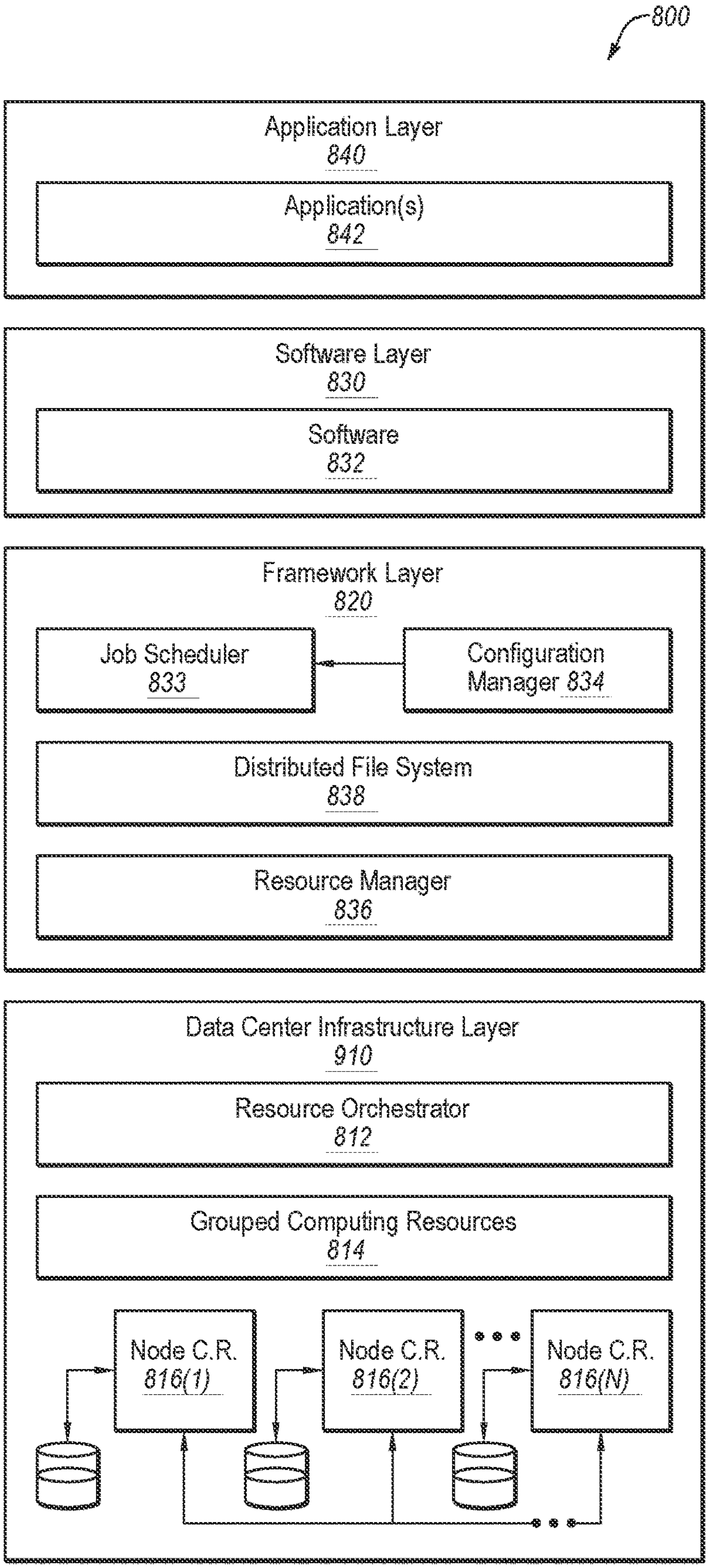
FIG. 8 is a block diagram of an example data center suitable for use in implementing some embodiments of the present disclosure.

FIG. 8 illustrates an example data center 800 that may be used in at least one embodiments of the present disclosure. The data center 800 may include a data center infrastructure layer 810, a framework layer 820, a software layer 830, and/or an application layer 840.

As shown in FIG. 8, the data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 816(1)-816(N) may correspond to a server having one or more of the above-mentioned computing resources. In addition, in some embodiments, the node C.R.s 816(1)-816(N) may include one or more virtual components, such as vGPUs, vCPUs, and/or the like, and/or one or more of the node C.R.s 816(1)-816(N) may correspond to a virtual machine (VM).

In at least one embodiment, grouped computing resources 814 may include separate groupings of node C.R.s 816 housed within one or more racks (not shown), or many racks housed in data centers at various geographical locations (also not shown). Separate groupings of node C.R.s 816 within grouped computing resources 814 may include grouped compute, network, memory or storage resources that may be configured or allocated to support one or more workloads. In at least one embodiment, several node C.R.s 816 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 812 may configure or otherwise control one or more node C.R.s 816(1)-816(N) and/or grouped computing resources 814. In at least one embodiment, resource orchestrator 812 may include a software design infrastructure (SDI) management entity for the data center 800. The resource orchestrator 812 may include hardware, software, or some combination thereof.

In at least one embodiment, as shown in FIG. 8, framework layer 820 may include a job scheduler 832, a configuration manager 834, a resource manager 836, and/or a distributed file system 838. The framework layer 820 may include a framework to support software 832 of software layer 830 and/or one or more application(s) 842 of application layer 840. The software 832 or application(s) 842 may respectively include web-based service software or applications, such as those provided by Amazon Web Services, Google Cloud and Microsoft Azure. The framework layer 820 may be, but is not limited to, a type of free and open-source software web application framework such as Apache Spark™ (hereinafter "Spark") that may utilize distributed file system 838 for large-scale data processing (e.g., "big data"). In at least one embodiment, job scheduler 832 may include a Spark driver to facilitate scheduling of workloads supported by various layers of data center 800. The configuration manager 834 may be capable of configuring different layers such as software layer 830 and framework layer 820 including Spark and distributed file system 838 for supporting large-scale data processing. The resource manager 836 may be capable of managing clustered or grouped computing resources mapped to or allocated for support of distributed file system 838 and job scheduler 832. In at least one embodiment, clustered or grouped computing resources may include grouped computing resource 814 at data center infrastructure layer 810. The resource manager 836 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 838 of framework layer 820. One or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 838 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 834, resource manager 836, and resource orchestrator 812 may implement any number and type of self-modifying actions based on any amount and type of data acquired in any technically feasible fashion. Self-modifying actions may relieve a data center operator of data center 800 from making possibly bad configuration decisions and possibly avoiding underutilized and/or poor performing portions of a data center.

The data center 800 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described in the present disclosure with respect to the data center 800. In at least one embodiment, trained or deployed machine learning models corresponding to one or more neural networks may be used to infer or predict information using resources described in the present disclosure with respect to the data center 800 by using weight parameters calculated through one or more training techniques, such as but not limited to those described herein.

In at least one embodiment, the data center 800 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described in the present disclosure may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 700 of FIG. 7—e.g., each device may include similar components, features, and/or functionality of the computing device(s) 700. In addition, where backend devices (e.g., servers, NAS, etc.) are implemented, the backend devices may be included as part of a data center 800, an example of which is described in more detail herein with respect to FIG. 8.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 700 described herein with respect to FIG. 7. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to codes that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B. Additionally, use of the term "based on" should not be interpreted as "only based on" or "based only on." Rather, a first element being "based on" a second element includes instances in which the first element is based on the second element but may also be based on one or more additional elements.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:

obtaining, using a machine learning (ML) model, an output of the ML model that includes an estimated velocity corresponding to an object as a whole, the estimated velocity being based at least on providing measured RADAR data to the ML model as an input to the ML model, the measured RADAR data corresponding to a plurality of RADAR detections associated with different portions of the object;

reconstructing, to generate expected RADAR data as a reconstruction of the measured RADAR data and formatted according to a format of the measured RADAR data, RADAR data corresponding to the different portions of the object based at least on one or more reverse calculations performed with respect to the estimated velocity; and updating one or more parameters of the ML model based at least on a difference between the measured RADAR data and the expected RADAR data, wherein the ML model is used by a machine to determine a detected velocity of a detected object detected using one or more RADAR sensors of the machine.

2. The method of claim 1, wherein the estimated velocity corresponding to the object includes one or more estimated velocities individually corresponding to one or more portions of the object.

3. The method of claim 2, wherein the one or more respective reverse calculations are performed with respect to the one or more estimated velocities.

4. The method of claim 1, wherein the estimated velocity is estimated prior to an ability to estimate a velocity corresponding to the object by identifying a plurality of bounding shapes corresponding to the object, individual bounding shapes of the plurality of bounding shapes associated with respective estimations of respective positions corresponding to the object.

5. The method of claim 1, wherein the measured RADAR data corresponds to a plurality of RADAR sensors.

6. The method of claim 1, wherein the ML model is updated to iteratively generate one or more additional estimated velocities until the difference between the measured RADAR data and the expected RADAR data reaches a particular threshold.

7. A system comprising:

one or more processors to perform operations comprising:

obtaining RADAR data corresponding to an object, the RADAR data captured within a time range and corresponding to a plurality of RADAR sensors;

estimating, using a machine learning (ML) model, a velocity corresponding to the object based at least on the RADAR data corresponding to the plurality of RADAR sensors, wherein the ML model was trained based at least on reconstructing, to generate expected RADAR data, previously measured RADAR data from one or more previously estimated velocities previously estimated by the ML model as one or more previous outputs generated using the ML model based at least on the previously measured RADAR data being provided to the ML model as one or more inputs to the ML model, the expected RADAR data being of a same data type as the previously measured RADAR data; and associating the velocity as estimated with the object detected using one or more object tracking techniques.

8. The system of claim 7, wherein the time range is within 50 milliseconds.

9. The system of claim 7, wherein the ML model was trained at least by:

determining an error based at least on a difference between the expected RADAR data and the previously measured RADAR data; and updated one or more parameters of the M model based at least on the error.

10. The system of claim 9, wherein the ML model is updated to iteratively generate the one or more previously estimated velocities until the difference between the previously measured RADAR data and the expected RADAR data reaches a particular threshold.

11. The system of claim 7, wherein the expected RADAR data is generated based at least on one or more respective reverse calculations from the one or more previously estimated velocities.

12. The system of claim 7, wherein the velocity corresponding to the object, as estimated, includes one or more estimated velocities individually corresponding to one or more portions of the object.

13. The system of claim 7, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system for presenting at least one of augmented reality content, virtual reality content, or mixed reality content;

a system for hosting one or more real-time streaming applications;

a system implemented using an edge device;

a system implemented using a robot;

a system for performing conversational AI operations;

a system implementing one or more large language models (LLMs);
a system for generating synthetic data;
a system incorporating one or more virtual machines (VMs);
a system implemented at least partially in a data center; or
a system implemented at least partially using cloud computing resources.

14. One or more processors comprising processing circuitry to perform one or more operations using a velocity estimate generated using a machine learning (ML) model, wherein the ML model is trained by:

determining, using the ML model, an estimated velocity corresponding to an object as a whole based at least on providing, as an input to the ML model, measured RADAR data corresponding to a plurality of RADAR detections associated with different portions of the object;

reconstructing the measured RADAR data according to a format of the measured RADAR data based at least on the estimated velocity to determine expected RADAR data corresponding to the different portions of the object; and updating one or more parameters of the ML model based at least on a difference between the measured RADAR data and the expected RADAR data, wherein the ML model is used by a machine to determine a detected velocity of a detected object detected using one or more RADAR sensors of the machine.

15. The one or more processors of claim 14, wherein the estimated velocity corresponding to the object includes one or more estimated velocities individually corresponding to one or more portions of the object.

16. The one or more processors of claim 14, wherein the one or more operations further comprise:

generating a control command based at least on the estimated velocity corresponding to the object, the control command directing one or more systems associated with the one or more processors to perform the one or more operations.

17. The one or more processors of claim 14, wherein the estimated velocity corresponding to the object is estimated prior to an ability to estimate a velocity corresponding to the object by identifying a plurality of bounding shapes corresponding to the object, individual bounding shapes of the plurality of bounding shapes associated with respective estimations of respective positions corresponding to the object.

18. The one or more processors of claim 14, wherein the estimated velocity corresponding to the object includes one or more estimated velocities individually corresponding to one or more portions of the object; and the determining the expected RADAR data is based at least on one or more respective reverse calculations from the one or more estimated velocities.

19. The one or more processors of claim 14, wherein the ML model is updated to iteratively generate one or more additional estimated velocities until the difference between the measured RADAR data and the expected RADAR data reaches a particular threshold.

20. The one or more processors of claim 14 included in a system, wherein the system is comprised in at least one of:

a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system for presenting at least one of augmented reality content, virtual reality content, or mixed reality content;
a system for hosting one or more real-time streaming applications;
a system implemented using an edge device;
a system implemented using a robot;
a system for performing conversational AI operations;
a system implementing one or more large language models (LLMs);
a system for generating synthetic data;
a system incorporating one or more virtual machines (VMs);
a system implemented at least partially in a data center; or
a system implemented at least partially using cloud computing resources.

* * * * *